United States Patent [19]
Kathirgamanathan et al.

[11] Patent Number: 6,153,726
[45] Date of Patent: Nov. 28, 2000

[54] TRANSPARENT CONDUCTING POLYMERS

[75] Inventors: Poopathy Kathirgamanathan, North Harrow; Sivagnanasundram Surendrakumar, Edgware, both of United Kingdom

[73] Assignee: Nissan Chemical Industries Ltd., Tokyo, Japan

[21] Appl. No.: 09/203,536

[22] Filed: Dec. 1, 1998

[30] Foreign Application Priority Data

Dec. 3, 1997 [GB] United Kingdom ............... 9725648
Dec. 3, 1997 [GB] United Kingdom ............... 9725649
Dec. 3, 1997 [GB] United Kingdom ............... 9725650

[51] Int. Cl.$^7$ ................................................ C08G 73/00
[52] U.S. Cl. ........................................................ 528/422
[58] Field of Search ............................................. 528/422

[56] References Cited

U.S. PATENT DOCUMENTS 4,102,873  7/1978  Griffith et al. .
4,413,052  11/1983  Green ........................... 430/327
5,470,943  11/1995  Sakata ........................... 528/353
5,648,270  7/1997  Kuhn ............................. 436/74

FOREIGN PATENT DOCUMENTS 0 053 937  6/1982  European Pat. Off. .
0 295 676  12/1988  European Pat. Off. .

OTHER PUBLICATIONS

Revne Rouniane de Chimie,1994, 39 (3), pp. 333–338 "On the Chemical Polymerization of Some Aromatic Amines", Cristofor I. Simionesci et al, Ref. No. KDNK/P20024EP, Application No. 98309512.6–2115.

C.I. Simionescu, et al., Rev. Roum. Chim, vol. 39, No. 3, pp. 333–338, "On the Chemical Polymerization of Some Aromatic Amines", 1994.

R.C. Faria, et al., Electrochimica Acta, vol. 44, No. 10, pp. 1597–1605, "Synthesis and Electrochemical Response of Poly–(1–Aminoanthacene) Films", 1999.

Harold W. Boone, et al., Macromolecules, vol. 29, No. 1, pp. 5835–5842, "Novel Polyaromatic Quinone Imines. 2. Synthesisof Model Compounds and Stereoregular Poly(Quinone Imines) From Disubstituted Anthraquinones", 1996.

H. K. Hall,Jr. et al., Macromolecules, vol. 28, No. 1, pp. 1–8, "Novel Polyaromatic Quinone Imines", Jan. 2, 1995.

Paul A. Williams, et al., Macromolecules, vol. 26, No. 21, pp. 5820–5821, "New Polyaromatic Quinone Imines From Anthraquinone II", 1993.

M. Dumitriu, et al., Thermochimica Acta, vol. 134, pp. 177–185, "On the Thermal Stability of Some New Polyazines and Polyazomethines", 1988.

Derwent Abstract, AN 91–129168, JP 3–068623, Mar. 25, 1991.

A. H. Frazer, et al., J. Polym. Sci., Polym. Chem. Ed., vol. 23, No. 11, "Polyamides from 2,6(7)–Diamino–9,10–Dihydro–9,10–Ethanoanthracene and 2,6(7)–Diaminoanthracene," 1995.

Doo Kyung Moon et al, "Synthesis of Poly 1–aminonaphthalene and Poly 1–aminoanthracene by Chemical Oxidative Polymerization and Characteristics of the Polymers", Macromolecules, vol. 26, pp. 6992–6997,1993 (month unknown).

*Primary Examiner*—Paul R. Michl
*Attorney, Agent, or Firm*—Oblon, Spivak, McClelland, Maier & Neustadt, P.C.

[57] ABSTRACT

There is disclosed poly (9-aminoanthracene) (P9-AA) free or substantially free of anthraquinone, methods of making such material and P9-AA in various oxidation states. Certain substituted 9 aminoanthracenes and polymers thereof are also disclosed as are polymers of 9 aminoanthracene with aniline.

37 Claims, 22 Drawing Sheets

TRANSPARENT CONDUCTING POLYMERS

The present invention relates to poly(9-aminoanthracenes) (hereafter P9-AAs) made from 9-aminoanthracene (hereafter 9-AA) of the formula (I) below

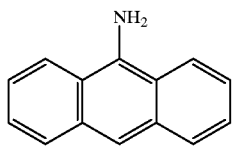

(I)

and to their production.

The inventor's initial attempts to polymerise 9-AA using chemical oxidative techniques gave variable results, some good and some bad. After many months work, they came to realise that contrary to what occurs with 1-aminoanthracene, chemical oxidative polymerisation of 9-AA produces a relatively insoluble by-product anthraquinone (hereafter AQ). This cannot be recycled in the reaction and is difficult to remove from the P9-AA.

After further extensive research, the inventors have devised an aerial oxidation procedure which produces P9-AA and unreacted 9-AA (which can be dissolved out and recycled) and the reaction product is free of AQ.

Accordingly, the present invention enables one to produce P9-AA of high purity. This has many useful properties and end uses. However, mixtures of P9-AA with AQ can also be useful for less demanding applications.

Accordingly, the present invention, in a less preferred form, also extends to such mixtures.

P9-AA is lightly coloured, transparent, electroconductive and sufficiently soluble in a range of commercially viable and environmentally friendly organic solvents. P9-AA finds many uses, for example as transparent coatings, used extensively in displays, e.g. electroluminescent and liquid crystal displays and to some extent in electromagnetic shielding windows.

Mixtures of P9-AA and AQ may find uses in static shielding where the volume conductivities which are required are of the order of $10^{-3}$ to $10^{-6}$ S cm$^{-1}$, and in electrostatic dissipation where it is wished to dissipate the charge on a charged material but at a rate that is neither too fast nor too slow and where the volume conductivities which are required are of the order of $10^{-6}$ to $10^{-9}$ S cm$^{-1}$. Such mixtures may also find uses as antistatic materials which, if applied to an article or surface, prevent charges building up on the surface and where the volume conductivities which are required are of the order of $10^{10}$ to $10^{-12}$ S cm$^{-1}$.

In particular, the present invention relates to 9-aminoanthracene polymers which are lightly coloured, transparent (transmittance of at least 50% in the range 400–800 nm at a thickness of 100 nanometers), and electroconductive. By electroconductive we mean polymers which exhibit a conductivity of at least $1 \times 10^{-12}$ S cm$^{-1}$, when measured by the four probe method as defined herein.

Polymers of aniline and applications thereof have been known for many years. Poly(1-aminoanthracene) (P1-AA hereafter) has also been described recently (Takakazu Yamamoto et al., Macromolecules, 1993, 26, pages 6992–6997). These polymers have similar structures to poly(aniline) and are dark coloured, varying from bluish-black, brown to brown-black powders. Yamamoto states P1-AA has conductivity of the order of $1 \times 10^{-4}$ S cm$^{-1}$. P1-AA is stated by Yamamoto to be soluble in organic solvents such as HCOOH, DMF, DMSO and NMP, slightly soluble in CHCl$_3$ and THF, and insoluble in CH$_3$OH, C$_2$H$_5$OH, CH$_3$CN, benzene and toluene. Yamamoto gives no indication of the transparency of P1-AA.

The present inventors have been seeking to develop a conductive polymer of improved conductivity, sufficient transparency to enable it to be used where light transmission as well as conductivity is required, and in addition solubility which would facilitate fabrication into useful structures, such as films, by solvent methods. In contrast to PL-AA we have discovered surprisingly that 9-aminoanthracene can be polymerised (preferably by aerial oxidation or certain electrochemical routes) to give lightly coloured (such as off-white, cream, and pale yellow), transparent (which herein means of transmission of at least 50% in the range 400–800 nm at a thickness of 100 nanometers), electroconductive polymers.

In particular, it has been found by the present inventors that pure poly(9-aminoanthracene) (hereafter P9-AA) is a lightly coloured electroconductive polymer which exhibits improved conductivity and is sufficiently soluble to be fabricated into, for example, films. This combination of properties including the higher conductivities makes the material suitable for use as a transparent coating for visual displays e.g. CRT's, LCD's etc. Currently, expensive Indium Tin Oxide (ITO) materials are used for this sort of application. P9-AA of lower conductivities is also suitable for use in static shielding, such as for computer components, where only a lower level of conductivity is required. Accordingly, diluted forms of P9-AA, such as mixtures of P9-AA and AQ, can be used in such applications.

These polymers may exhibit a particular advantage over the transparent ITO films currently employed in transparent coatings. The ITO coatings lose most or all of their electroconductivity if the surface is bent. However, the polymers according to the present invention maintain their electroconductivity even when bent.

According to one aspect of the present invention, 9-AA is polymerised to produce P9-AA, free or substantially free of AQ, for example as evidenced by the absence of IR peaks at 1680 cm$^{-1}$ and the cluster of four peaks between 1300 and 1350 cm$^{-1}$ which are characteristic of AQ.

The invention also extends to P9-AAs having an oxidation state from zero to 1.0 and a formula (II) at an oxidation state of zero and a formula (III) at an oxidation state of 1.0 as follows

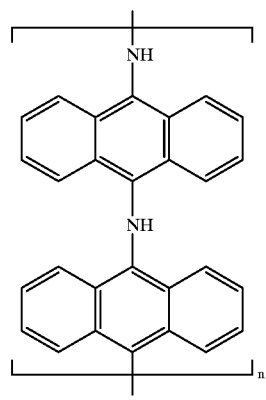

(II)

(III)

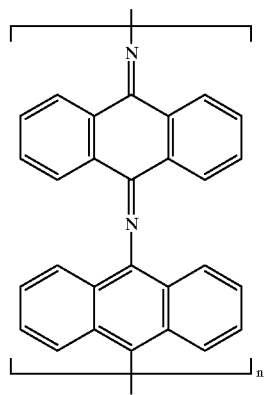

in which n is an integer ranging from 10 to 100, preferably from 50 to 80 e.g. about 70.

Polymers with lower values of n, e.g. 2 to 10, which may be referred to as oligomers, will have higher solubility but may have lower heat stability.

The invention also extends to P9-AAs having an oxidation state between 0.25 to 0.75, and a formula (IV) at an oxidation state 0.25, a formula (V) at an oxidation state 0.5 and a formula (VI) at an oxidation state 0.75 as follows (IV)

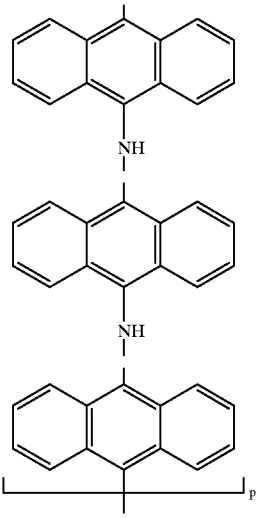

(V)

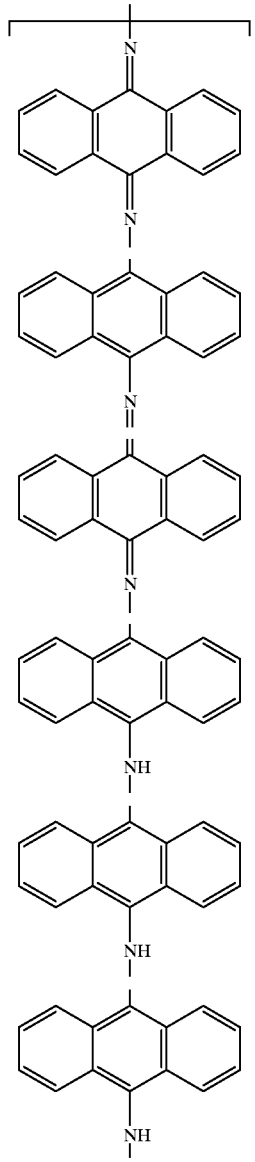

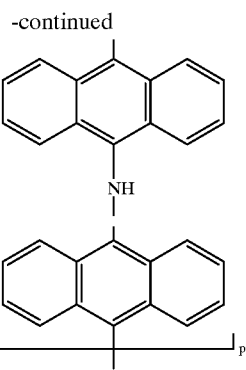

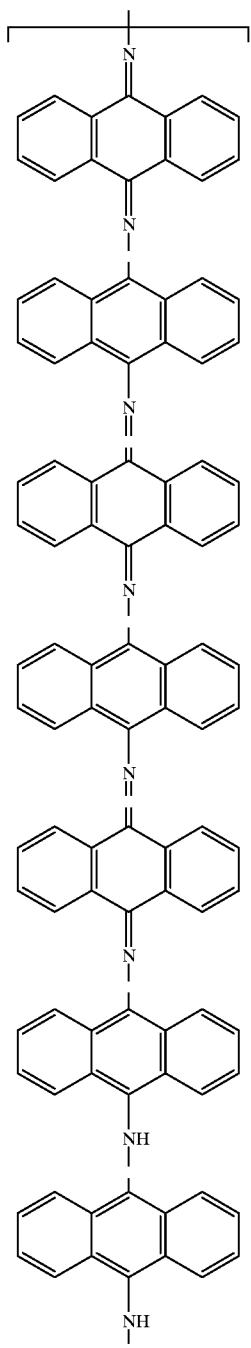

(VI)

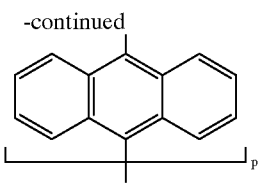

in which p is an integer ranging from 2 to 25, preferably from 10 to 20 e.g. about 15 to 20.

The P9-AA of the present invention exhibits improved conductivity and is therefore useful in thin film technology, such as EMI, RFI (electro magnetic interference, radio frequency interference), shielding materials and in display systems, such as electroluminescent and liquid crystal display systems as a transparent electrode.

The P9-AA of the present invention may also be directly deposited chemically or electrochemically onto and/or impregnated into a porous polymer film such as poly(vinyl chloride), poly(carbonate) or poly(propylene). The surface of a component so formed is permanently conductive and has good antistatic properties.

This surface may be painted with coloured dyes or pigments and the colour modified without impairing the antistatic properties. This method enables antistatic floors and mats to be fabricated from the composites.

Furthermore, non-conductive materials such as talc or mica may be coated with the P9-AA of the invention either chemically or electrochemically. Such coated powders are useful as fillers for the formulation of conductive polymer composites.

Furthermore, solutions of the solvent soluble polymers can be sprayed onto a non-conducting surface which will then become conductive on evaporation of the solvent therefrom. The resulting film can be used in display devices.

P9-AA may be used with other polymers (or binders). The P9-AA—binder blend may comprise from 5 to 70% by weight of the P9-AA and from 95 to 30% by weight of the other polymer. The polymer with which the P9-AA is blended may be, for example, poly(vinyl chloride), polyethylene, polypropylene, polystyrene, nylon, poly (acrylonitrile-butadiene-styrene), poly(ethylene terephthalate) or poly(ethylene oxide).

These blends may have sufficient conductivities to give good antistatic properties at the lower concentrations of P9-AA. At the higher concentrations the blends may possess levels of conductivity which may be useful for shielding.

Furthermore, the P9-AA imparts the required electrical property to the blend immediately and unlike alkylammonium salts, does not need moisture to impart conductivity to the polymer.

Conductive adhesives may be formulated using the P9-AA of the present invention.

The pure P9-AA of the present invention may be prepared by aerial oxidation. 9-AA may be oxidised to the polymer from its salt 9-aminoanthracene hydrochloride e.g. in the presence of air via the process of neutralising the acidic solution over a period of time to a pH in the range 8 to 10 using mildly basic conditions, for example 5% ammonia solution, the solution being maintained at a pH in the range 5 to 6.5 for a period of at least 2 hours.

The solution is maintained at a pH in the range 5 to 6.5, preferably 5.5 to 6.2, more preferably 5.8 to 6.0 and is maintained at such pH while being stirred in air preferably at room temperature for at least 2 hours, preferably at least 3 hours e.g. 3 to 6 hours, though longer times up to 18 hours have been used successfully without generation of AQ detectable in the IR spectrum of the reaction product.

It will be appreciated that the stirring in air only constitutes mildly oxidative conditions; it is not intended to exclude conditions which are more oxidative so long as they do not result in the generation of AQ detectable in the IR spectrum of the reaction product.

In a preferred specific form of the invention 9-nitroanthracene is reacted with hydrated tin chloride and acetic acid in the presence of concentrated HCl to produce an aqueous solution of 9-aminoanthracene hydrochloride salt, and the solution is stirred in air at room temperature while 5% aqueous ammonia solution is added slowly until the pH rises to 1.8 to 2.0, the solution is stirred at this pH for at least 5 minutes and then further 5% aqueous ammonia is added slowly to bring the pH up to the range 5.8 to 6.0 and the stirring is continued at that pH for 3 to 6 hours and then further 5% aqueous ammonia is added to bring the pH into the range 8.5 to 9.0 with continued stirring, and the yellow solid which precipitates out is recovered.

The reaction is preferably carried out either in water, in a single organic solvent, in a mixture of organic solvents or in a water-solvent mixture, desirably selected so that the 9-AA will be completely soluble in the solvent system chosen, though a slurry or dispersion can be used.

The purity of the P9-AA produced can be determined by inspection of the infra-red (IR) spectra produced. The inventors have found that a competing reaction to the polymerisation of 9-AA occurs which is the production of AQ. The IR spectrum of this compound has characteristic peaks at 1680 cm$^{-1}$ (sharp) and a distinctive cluster of peaks between 1300 and 1350 cm$^{-1}$ (see IR spectrum for AQ, FIG. 5).

An IR spectrum for a sample of pure P9-AA does not show these peaks characteristic of AQ, indicating that, during the reaction, the only process occurring is the production of the polymer and not of the competing product AQ.

According to a second aspect of the invention, a mixture of P9-AA with AQ is provided. Preferably, the ratio of P9-AA to AQ is in the range 35:65 to 99.99:0.01. More preferably, it is in the range 35:65 to 50:50, which gives good conductivity at substantial dilution of the P9-AA and is thus a cost benefit. Proportions of 75:25 P9-AA to AQ and above also give good conductivity. The mixture may be a result of the combination of pure P9-AA as produced, for example, by the aerial oxidation mentioned above, with pure AQ which may be obtained 99% pure from Aldrich Chemicals.

Alternatively, the P9-AA may be prepared by oxidising the monomer 9-AA with an oxidant which has a higher oxidation potential than the monomer, either in the presence of an acid HX to provide the counterions or using the oxidising agent itself to provide the counterions, but this will produce AQ as a by-product. The oxidation may be carried out in the presence or absence of a catalyst, and as a single phase or multiphase reaction. This procedure is referred to as "chemical oxidative polymerisation" herein.

Again, the reaction is preferably carried out either in a single organic solvent, in a mixture of organic solvents or in a water-solvent mixture, desirably selected so that the P9-AA will be completely soluble in the solvent system chosen, though a slurry or dispersion can be used.

The concentration of the oxidant is preferably in the range from 0.5 to 4 times the concentration of the 9-AA monomer.

This chemical oxidative polymerisation is preferably carried out at temperatures between room temperature and 110° C.

Examples of suitable oxidants are iron (III) chloride, ammonium persulphate, hydrogen peroxide, nitrosonium tetrafluroborate, molybdenum (V), ruthenium (III), manganese (III), cerium (IV), copper (II) and also in iron (III)/iron (II), molybdenum (V)/ruthenium (III) mixed systems, which may be used in the form of salts, such as halides, carboxylates e.g. acetates or nitrates.

Production of the P9-AA in this way produces a mixture of P9-AA and AQ as each of the two competing reactions occur.

The monomer 9-AA may also be polymerised by casting it as a thin film dissolved in a suitable organic solvent. The oxidant may be applied to the monomer by washing or soaking the monomer film with a solution of the oxidant or the oxidant may be coated on top of the film to produce a multilayer film which is then dried e.g. vacuum dried. In this thin film embodiment of the invention the oxidant may be mixed with the monomer and the mixture then coated as a thin film. A further technique involves coating an article e.g. a textile fabric or a film e.g. of polymer with a solution of the monomer e.g. by immersion of the material in the monomer solution, then immersion of the monomer coated material in a solution of the oxidant followed by drying of the coated oxidised material to leave it with a conductive polymer coating on its surface or the surfaces of the component elements of the material e.g. the fibres of a textile. Again, these techniques produce a mixture of P9-AA and AQ.

The chemical polymerisation may also be performed by vapour deposition of the monomer onto a carrier coated with oxidant or vice versa.

Electrochemical polymerisation may be carried out under a variety of conditions. The electrodes at which polymerisation may occur are preferably made from any conductor inert in the electrolyte used, examples of which are those made from platinum, graphite, indium tin oxide, tungsten, titanium, niobium, nickel and lead e.g. platinized titanium.

The anions of the supporting electrolyte used in electrochemical polymerisation may be any of the counterions, Cl$^-$, Br$^-$, SO$_4^{2-}$, BF$_4$, PF$_6^-$, H$_2$PO$_3^-$, H$_2$PO$_4^-$, ClO$_4$, aryl sulphonate, arene dicarboxylate, arene carboxylate, polystyrene sulphonate, poly acrylate, C$_1$–C$_6$ alkyl sulphonate, vinyl sulphonate, vinyl benzene sulphonate, cellulose sulphonate, cellulose sulphate or perfluorinated poly anion.

Polymer may be obtained by electropolymerisation at constant potential or at constant current or by a potential dynamic method such as repetitive cyclic voltammetry.

Electrochemical polymerisations may be carried out in a polar organic solvent such as acetonitrile, dichloromethane, chloroform, nitromethane, nitrobenzene, propylene carbonate, dichloroethane, N-methylpyrrolidone, sulpholane, dimethylformamide, dimethyl sulphoxide, dichlorobenzene, e.g. 1,4-dichlorobenzene or trichlorobenzene or a mixture of two or more thereof. Polymerisation in an organic solvent can be carried out in the presence of a proton abstractor, such as pyridine. In a particularly preferred system we have used 1,2-dichlorobenzene as the solvent and tetrabutylammonium perchlorate as the supportive electrolyte and have obtained polymers of good conductivity. Such electropolymerisation has been carried out both at constant current and at constant potential.

Other electrochemical polymerisation conditions include aqueous media e.g. aqueous acidic media.

Electrochemical polymerisation is preferably carried out at temperatures between −80° C. and 50° C.

The present invention in a third aspect relates to precursors for certain P9-AAs, namely 9-aminoanthracene (hereafter 9-AA) derivatives of the formula (I) below

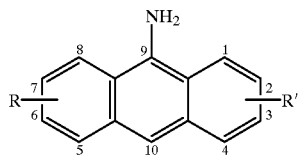

VII where R and R'=H or certain specified groups and to the corresponding poly(9-aminoanthracenes) and to their production. The polymers are lightly coloured, transparent, electroconductive and fairly soluble in a range of commercially viable and environmentally friendly organic solvents. These polymers find many uses, for example in antistatic applications and in electromagnetic and static shielding windows.

In particular, the present invention relates to certain substituted 9-AA polymers which are lightly coloured, transparent (transmittance of at least 40% in the range 400–800 nm at a thickness of 100 nanometers), which are electroconductive at a level suitable for the chosen application. For example, a conductivity of $10^{-12}$–$10^{-10}$ S cm$^{-1}$ is appropriate for antistatic applications, whereas for static shielding/screening a conductivity in the range $10^{-6}$ –$10^{-3}$ S cm$^{-1}$ is needed. It will be appreciated that suitable doping of the polymers can be used to enhance the conductivities.

The applicants are aware that 4,5dichloro-9-aminoanthracene is a known compound from Chemical Abstracts no. 95:203132 cited by the UK Patent Office, and which is an abstract of I. I. Schuster J. *Ore. Chem.* 1981, 46, pp5110–5118.

According to the third aspect of the present invention, substituted 9-AA moieties are provided of the general formula;

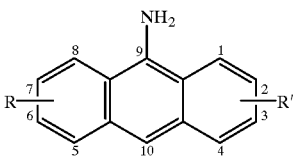

(VII)

where, R may be the same as or different to R', and may be a hydrogen atom (when R=R'=H, the compound is 9-AA), or CH$_3$, CH$_3$CH$_2$—, —OCH$_3$, —OCH$_2$CH$_3$, —CH$_2$OCH$_3$, -CH$_2$OCH$_2$CH$_2$OCH$_3$, methoxyethoxyethoxymethyl, aryloxymethyl, phenyl, Cl, Br, CN or NO$_2$, —CH$_2$COOR or —CH$_2$NHCOR" (where R" is C$_1$–C$_6$ alkyl or a phenyl or biphenyl group), provided that R and R' are not both hydrogen.

The invention also extends to poly (9-aminoanthracenes) (hereafter P9-AAs) having an oxidation state from zero to 1.0 and a formula (VIII) at an oxidation state of zero and a formula (IX) at an oxidation state of 1.0 as follows

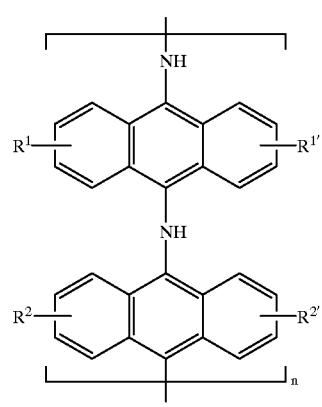

(VIII)

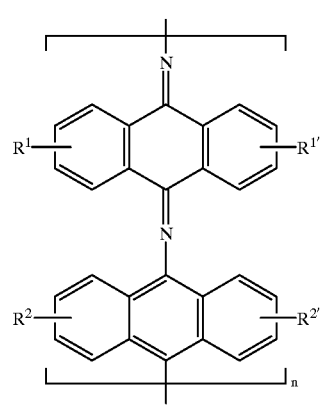

(IX)

in which R1 and R2 can be the same or different and R1' and R2' can be the same or different and can be the same or different to R1 and R2 and n is an integer ranging from 10 to 100, preferably 50 to 80 e.g. about 70.

Polymers with lower values of n, e.g. 2 to 10, which may be referred to as oligomers, will have higher solubility but may have lower heat stability.

Preferably, R1=R2=R3=R4=H and R1'=R2'=R3'=R4'=CH$_3$, CH$_3$CH$_2$—, —OCH$_3$, —OCH$_2$CH$_3$, —CH$_2$OCH$_3$, —CH$_2$OCH$_2$CH$_2$OCH$_3$, methoxyethoxyethoxymethyl, aryloxymethyl, phenyl, Cl, Br, CN or NO$_2$, —CH$_2$COOR or —CH$_2$NHCOR" (where R" is C$_1$–C$_6$ alkyl or a phenyl or biphenyl group).

The invention also extends to P9-AAs having an oxidation state between 0.25 to 0.75, and a formula (X) at an oxidation state 0.25, a formula (XI) at an oxidation state 0.5 and a formula (XII) at an oxidation state 0.75 as follows

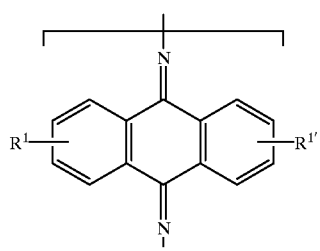

(X)

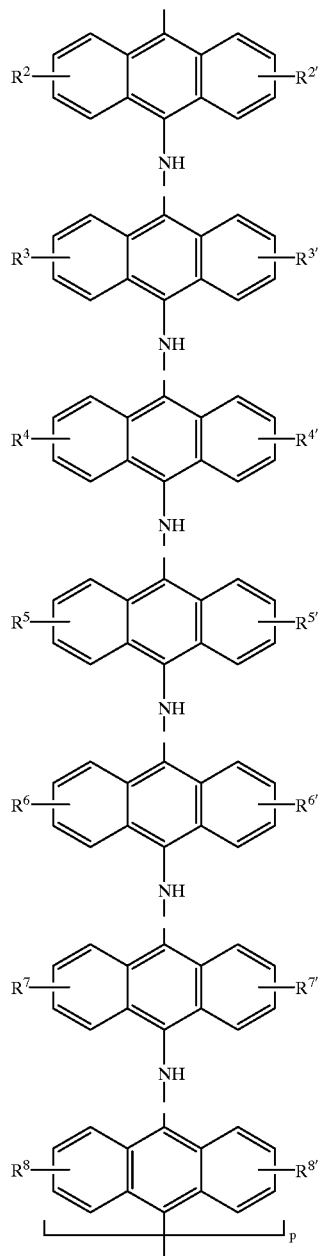
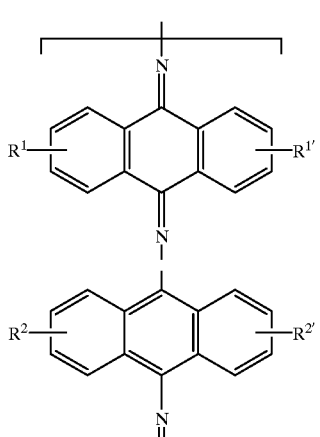
(XI)
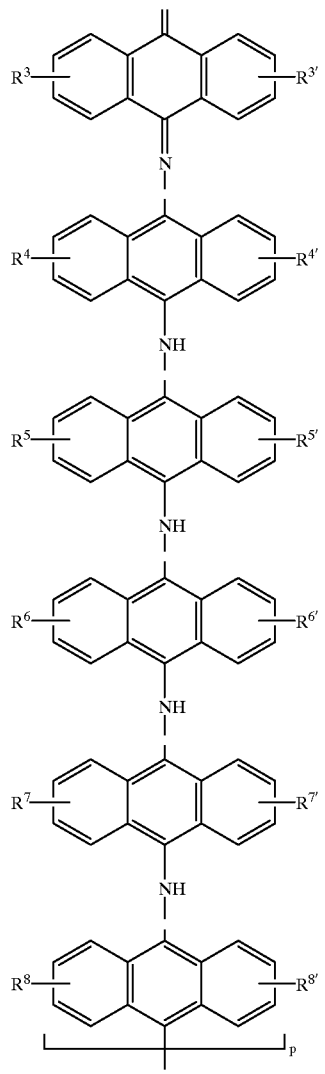
(XII)
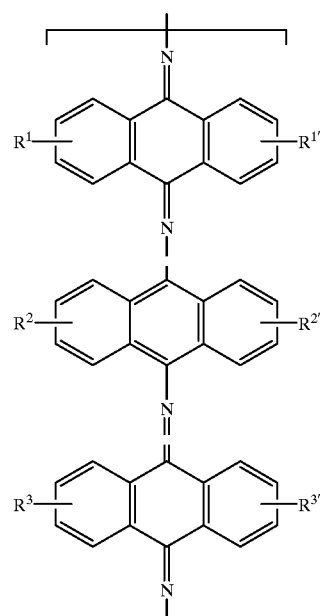

-continued

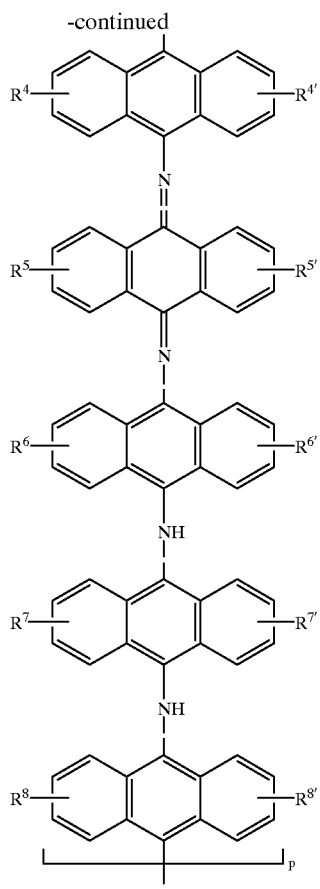

in which R1, R2, R3, R4, R5, R6, R7 and R8 can be the same or different and R1', R2', R3', R4', R5', R6', R7' and R8' can be the same or different and can be the same or different to R1, R2, R3, R4, R5, R6, R7 and R8 and p is an integer ranging from 2 to 25, preferably from 10 to 20 e.g. about 15 to 20.

Preferably, R1=R2=R3=R4=R5=R6=R7=R8=H and R1'=R2'=R3'=R4'=R5'=R6'=R7'=R8'=CH$_3$, CH$_3$CH$_2$—, —OCH$_3$, —OCH$_2$CH$_3$, —CH$_2$OCH$_3$, —CH$_2$OCH$_2$CH$_2$OCH$_3$, methoxyethoxyethoxymethyl, aryloxymethyl, phenyl, Cl, Br, CN or NO$_2$, —CH$_2$COOR or —CH$_2$NHCOR" (where R" is C$_{1-C6}$ alkyl or a phenyl or biphenyl group).

A desirable arrangement of R and R' is when R=H and R' is one of the other specified substituents.

The preferred position of substitution is position –2 of the B-ring (the ring to the right of the amine group in formula I above).

The 2-substituted 9-AA monomers of the present invention may be prepared from the 2-substituted anthracenes via stereoselective nitration at the 9 position under controlled mild conditions and reduction by a suitable reducing agent. The nitration needs to be mild so as to ensure predominant nitration at the 9 position rather than elsewhere in the molecule.

Nitration with N$_2$O$_4$ gas is another useful technique.

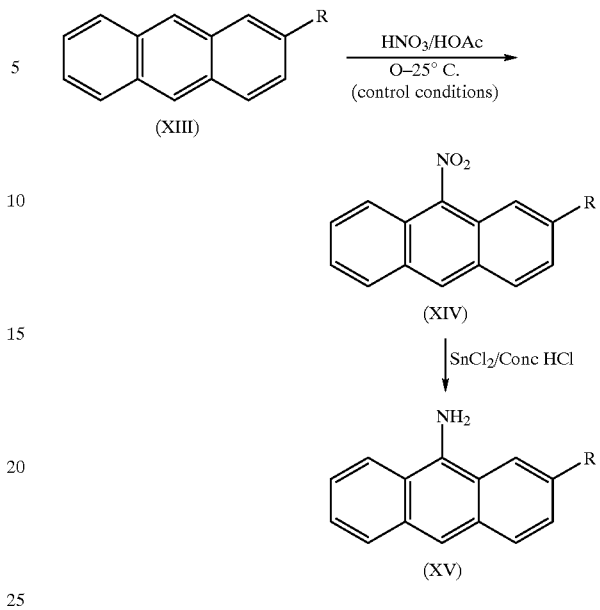

The poly(9-aminoanthracene) (hereafter P9-AA) derivatives of the invention are conductive and transparent and are therefore useful in thin film technology, as EMI, RFI (electro magnetic interference, radio frequency interference) shielding materials, and in static shielding/screening applications and in antistatic applications.

Certain of the 9-AA derivatives (for example 2-methyl-9-aminoanthracene and 2-ethyl-9-aminoanthracene) are appreciably soluble, namely at least 0.8% (m/v) in useful common organic solvents (for example N-methyl-2-pyrrolidone (NMP), dimethylformamide (DMF), 1,1,1,3,3,3-hexafluoro-2-propanol (HFP), formic acid and trifluoroacetic acid (TFA)). This enables coating formulations to be made with or without binders (i.e. other polymers which are soluble). The polymer—binder blend may comprise from 5 to 70% by weight of the P9-AA derivative and from 95 to 30% by weight of the other polymer. The polymer with which the P9-AA derivative is blended may be, for example, poly(vinyl chloride), polyethylene, polypropylene, polystyrene, nylon, poly(acrylonitrile-butadiene-styrene), poly(ethylene terephthalate) or poly(ethylene oxide).

These blends may have sufficient conductivities to give good antistatic properties at the lower concentrations of P9-AA derivative. At the higher concentrations the blends possess levels of conductivity which may be useful for shielding.

Furthermore, the P9-AA derivatives impart the required electrical property to the blend immediately and unlike alkylammonium salts, do not need moisture to impart conductivity to the polymer.

Conductive adhesives may be formulated using the P9-AA derivatives of the present invention.

The P9-AA derivatives of the present invention may also be directly deposited chemically or electrochemically onto and/or impregnated into a porous polymer film such as poly(vinyl chloride), poly(carbonate) or poly(propylene). The surface of a component so formed is permanently conductive and has good antistatic properties.

This surface may be painted with coloured dyes or pigments and the colour modified without impairing the antistatic properties. This method enables antistatic floors and mats to be fabricated from the composites.

Furthermore, non-conductive materials such as talc or mica may be coated with the P9-AA derivatives of the invention either chemically or electrochemically. Such coated powders are useful as fillers for the formation of conductive polymer composites.

Furthermore, solutions of the solvent soluble polymers can be sprayed onto a non-conducting surface which will then become conductive on evaporation of the solvent therefrom.

The P9-AA derivatives of the present invention may be prepared by oxidising the monomer derivatives of 9-AA with an oxidant which has a higher oxidation potential than the monomer, either in the presence of an acid HX to provide the counterions or using the oxidising agent itself to provide the counterions. The oxidation may be carried out in the presence or absence of a catalyst, and as a single phase or multiphase reaction.

The reaction is preferably carried out in a single organic solvent, in a mixture of organic solvents or in a water-solvent mixture, selected so that the 9-AA derivative will be completely soluble in the solvent system chosen.

The concentration of the oxidant is preferably in the range from 0.5 to 4 times the concentration of the 9-AA monomer.

The chemical polymerisation is preferably carried out at temperatures between room temperature and 110° C.

Examples of suitable oxidants are iron (III) chloride, ammonium persulphate, hydrogen peroxide, nitrosonium tetrafluroborate, molybdenum (V), ruthenium (III), manganese (III), cerium (IV), copper (II) and also in iron (III)/iron (II), molybdenum (V)/ruthenium (III) mixed systems, which may be used in the form of salts, such as halides, carboxylates e.g. acetates or nitrates.

The monomer derivatives of 9-AA may also be polymerised by casting them as a thin film dissolved in a suitable organic solvent. The oxidant may be applied to the monomers by washing or soaking of an article carrying the monomer film in a solution of the oxidant or the oxidant may be coated on top of the film to produce a multilayer film which is then dried e.g. vacuum dried. In these thin film embodiments of the invention the oxidant may be mixed with the monomer and the mixture then coated as a thin film.

A further technique involves coating an article e.g. a textile fabric or a film e.g. of polymer with a solution of the monomer e.g. by immersion of the material in the monomer solution, then immersion of the monomer coated material in a solution of the oxidant followed by drying of the coated oxidised material to leave it with a conductive polymer coating on its surface or the surfaces of the component elements of the material e.g. the fibres of a textile.

The chemical polymerisation may also be performed by vapour deposition of the monomer onto a carrier coated with oxidant or vice versa.

The polymers of the present invention may also be prepared electrochemically under a variety of conditions. The electrodes at which polymerisation occurs are preferably made from any conductor inert in the electrolyte used, examples of which are those made from platinum, graphite, indium tin oxide, tungsten, titanium, niobium, nickel or lead e.g. platinized titanium.

The anions of the supporting electrolyte for the electrochemical polymerisation may be any of the counterions, $Cl^-$, $Br^-$, $SO_4^{2-}$, $BF_4^-$, $PF_6^-$, $H_2PO_3^-$, $H_2PO_4^-$, $ClO_4^-$, aryl sulphonate, arene dicarboxylate, arene carboxylate, polystyrene sulphonate, poly acrylate, $C_1$–$C_6$ alkyl, sulphonate, vinyl sulphonate, vinyl benzene sulphonate, cellulose sulphonate, cellulose sulphate or perfluorinated poly anion.

Polymer may be obtained by electropolymerisation at constant potential, or at constant current or by a potential dynamic method such as repetitive cyclic voltammetry.

Electrochemical polymerisations may be carried out in a polar organic solvent such as acetonitrile, dichloromethane, chloroform, nitromethane, nitrobenzene, propylene carbonate, dichloroethane, N-methylpyrrolidone, sulpholane, dimethylformamide, dimethyl sulphoxide or dichlorobenzene, e.g. 1,4-dichlorobenzene or trichlorobenzene or a mixture of two or more thereof. Polymerisation in an organic solvent can be carried out in the presence of a proton abstractor, such as pyridine. Other electrochemical polymerisation conditions include aqueous media, e.g. aqueous acidic media. The electrochemical polymerisation is preferably carried out at temperatures between −80° C. and 50° C.

The present invention in the fourth aspect relates to co-polymers of 9-aminoanthracene (hereafter 9-AA) with aniline and to their production. The co-polymers are lightly coloured, transparent, electroconductive and fairly soluble in a range of commercially viable and environmentally friendly organic solvents. These co-polymers find many uses, for example as transparent coatings, used extensively in displays, e.g. electroluminescent and liquid crystal displays and to some extent in electromagnetic shielding windows and static shielding applications.

In particular, this fourth aspect of the present invention relates to certain co-polymers which are lightly coloured, transparent and exhibit a conductivity of at least $1 \times 10^{-6}$ S $cm^{-1}$, when appropriately doped and when measured by the four probe method as defined herein.

The applicants are aware of three Journal articles cited by the UK Patent Office, namely: A. Everaerts) et al., *Polym. Prepr.* (Am. Chem. Soc., Div. Polym. Chem.) 24 (7) pp1703–16 (1986) (hereafter Everaerts); P. A. Williams et al., *Macromolecules* 1993, 26, pp5820–5821 (hereafter Williams) and H. W. Boone et al., *Polym. Prepr.* (Am. Chem. Soc., Div. Polym. Chem.) 37 (1) pp676–7 (1996).

The present inventors have been seeking to develop a conductive co-polymer of sufficient transparency to enable it to be used where light transmission as well as conductivity is required, and in addition solubility which would facilitate fabrication into useful structures, such as films, by solvent methods. In contrast to P1-AA we have discovered surprisingly that co-polymers of 9-AA and aniline are lightly coloured (such as off-white, cream, and pale yellow), transparent and electroconductive polymers.

These co-polymers may exhibit a particular advantage over the transparent Indium Tin Oxide (ITO) films currently employed in transparent coatings. The ITO coatings lose most or all of their electroconductivity if the surface is bent. However, the co-polymers according to the present invention maintain their electroconductivity even when bent.

According to this fourth aspect of the present invention, co-polymers of 9-AA with aniline are produced.

The invention also extends to co-polymers having the general formula (XVI)

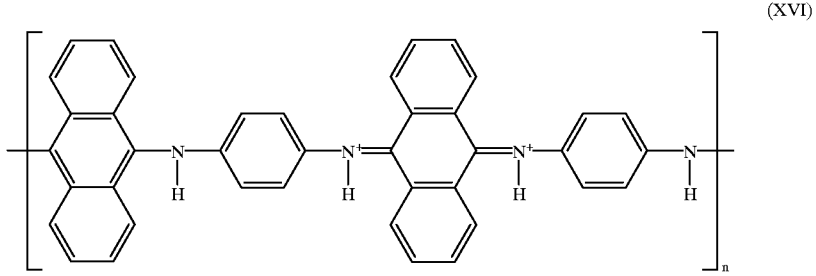

(XVI)

where n is an integer ranging from 4 to 50, preferably 8 or 10 to 40, more preferably 10 to 25 e.g. 15 to 20.

Polymers with lower values of n, e.g. 2 to 4, which may be regarded as oligomers, will have higher solubility and may have lower heat stability.

The co-polymers of this aspect of the invention have conductivities such that they are useful in thin film technology, as EMI, RFI (electro magnetic interference, radio frequency interference) shielding materials and in display systems, such as electroluminescent and liquid crystal display systems as a transparent electrode.

Certain of the co-polymers of this fourth aspect of the invention are appreciably soluble, namely at least 1% (m/v) in useful common organic solvents (for example N-methyl-2-pyrrolidone (NMP), dimethylformamide (DMF), 1,1,1,3,3,3-hexafluoro-2-propanol (HFP), formic acid and trifluoroacetic acid (TFA)). This enables coating formulations to be made with or without binders (i.e. other polymers which are soluble). The co-polymer—binder blend may comprise from 5 to 70% by weight of the co-polymer and from 95 to 30% by weight of the other polymer. The polymer with which the co-polymer is blended may be, for example, poly(vinyl chloride), polyethylene, polypropylene, polystyrene, nylon, poly(acrylonitrile-butadiene-styrene), poly(ethylene terephthalate) or poly(ethylene oxide).

These blends may have sufficient conductivities to give good antistatic properties at the lower concentrations of co-polymer. At the higher concentrations the blends possess levels of conductivity which may be useful for shielding.

Furthermore, the co-polymers impart the required electrical property to the blend immediately and unlike alkylammonium salts, do not need moisture to impart conductivity to the polymer.

Conductive adhesives may be formulated using the co-polymers of the present invention.

The co-polymers of the fourth aspect of the present invention may also be directly deposited chemically or electrochemically onto and/or impregnated into a porous polymer film such as poly(vinyl chloride), poly(carbonate) or poly(propylene). The surface of a component so formed is permanently conductive and has good antistatic properties.

This surface may be painted with coloured dyes or pigments and the colour modified without impairing the antistatic properties. This method enables antistatic floors and mats to be fabricated from the composites.

Furthermore, non-conductive materials such as talc or mica may be coated with the co-polymers of the invention either chemically or electrochemically. Such coated powders are useful as fillers for the formation of conductive polymer composites.

Furthermore, solutions of the solvent soluble co-polymers can be sprayed onto a non-conducting surface which will then become conductive on evaporation of the solvent therefrom. The resulting film can be used in display devices.

The co-polymers of the fourth aspect of the present invention may be prepared by co-polymerising 9-AA with aniline using a suitable oxidant. Preferably the oxidant is ammonium persulphate. Typically, 9-AA is dissolved in a suitable solvent. This solution is stirred at room temperature and a mixture of aniline and acid in water is added. Different molar ratios of 9-AA:aniline may be used, preferably in the range 1:5 to 20:1, more preferably 1:2 to 8:1 and most preferably in the range 1:2 to 2:1. The solution is stirred until it becomes homogeneous when ammonium persulphate in water is added. The solution is stirred until it becomes coloured, which typically takes at least 6 hours. It is then filtered, washed with water, methanol and dried in vacuo for a few hours, e.g. 5 to 6 hours, at 50° C.

The co-polymers may be doped to enhance their conductivity. Examples of suitable dopants include camphorsulphonic acid (CSA), 5-sulphosalicylic acid (5-SSA), hydrochloric acid (HCl) and fluoroboric acids e.g. $HBF_4$.

The present invention may be put into practice in various ways and a number of specific embodiments will be described to illustrate the invention with reference to the accompanying examples, which show the successful synthesis of the monomer for use in the invention, polymers made therefrom, a variety of polymerization methods and techniques for doping the polymers. Doping the polymers is a conventional technique for increasing the conductivity.

Reference is also made to the figures accompanying the examples, in which.

The following examples 1 and 2 relate to the preparation of the monomer, 9-AA; examples 3 to 9 relate to polymerisations of the monomers by aerial oxidation, chemical oxidation and by electrochemical means. Examples 10 to 12 relate to doping of the 9-AA polymers. Examples 13 to 21 relate to mixtures of P9-AA with AQ.

All reaction procedures and measurements of properties are carried out at room temperature and pressure unless otherwise stated.

The conductivity of the polymers was measured by the four-probe method on a standard disc of the sample polymer. This method is as follows. The powdered polymer is compressed into a thin pellet of uniform thickness. A linear spring loaded four probe conductivity cell is used to determine the conductivity. The outer two electrodes are used to measure the current (I), the voltage (V) being measured across the inner two. The volume conductivity is then calculated according to the following equation:

$$\text{resistance} = \frac{1}{\text{conductivity}} = 4.532 \frac{V}{I} \times \text{thickness of pellet}$$

EXAMPLES 1 and 2

Preparation of the monomer

EXAMPLE 1

Preparation of 9-nitroanthracene.

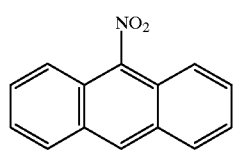

(XVII)

Anthracene (10.0 g, 0.056 mole) was suspended in glacial acetic acid (40 ml) in a 250 ml three-necked round bottomed flask fitted with a mechanical stirrer and maintained at 20–25° C. Concentrated nitric acid (70% by weight, sp.gr. 1.42) (4.0 ml) was added dropwise with vigorous stirring over a period of 15 minutes and the temperature of the flask was maintained below 30° C. After 1 hour a mixture of Conc. HCl (50 ml) and glacial acetic acid (50 ml) was added slowly to the clear solution. A pale yellow precipitate of 9-nitro-10-chloro-9,10-dihydroanthracene separated out, and was filtered off under suction, washed with 25 ml portions of glacial acetic acid and thoroughly with water until the washings were neutral. The product was removed from the funnel and triturated with warm (60–70° C.) 10% sodium hydroxide solution and filtered under suction. The crude yellow 9-nitroanthracene was washed with warm water until the washings were neutral and the solid was air dried. This solid was recrystallised from glacial acetic acid, yield 9.8 g (78%).

Figure 1:
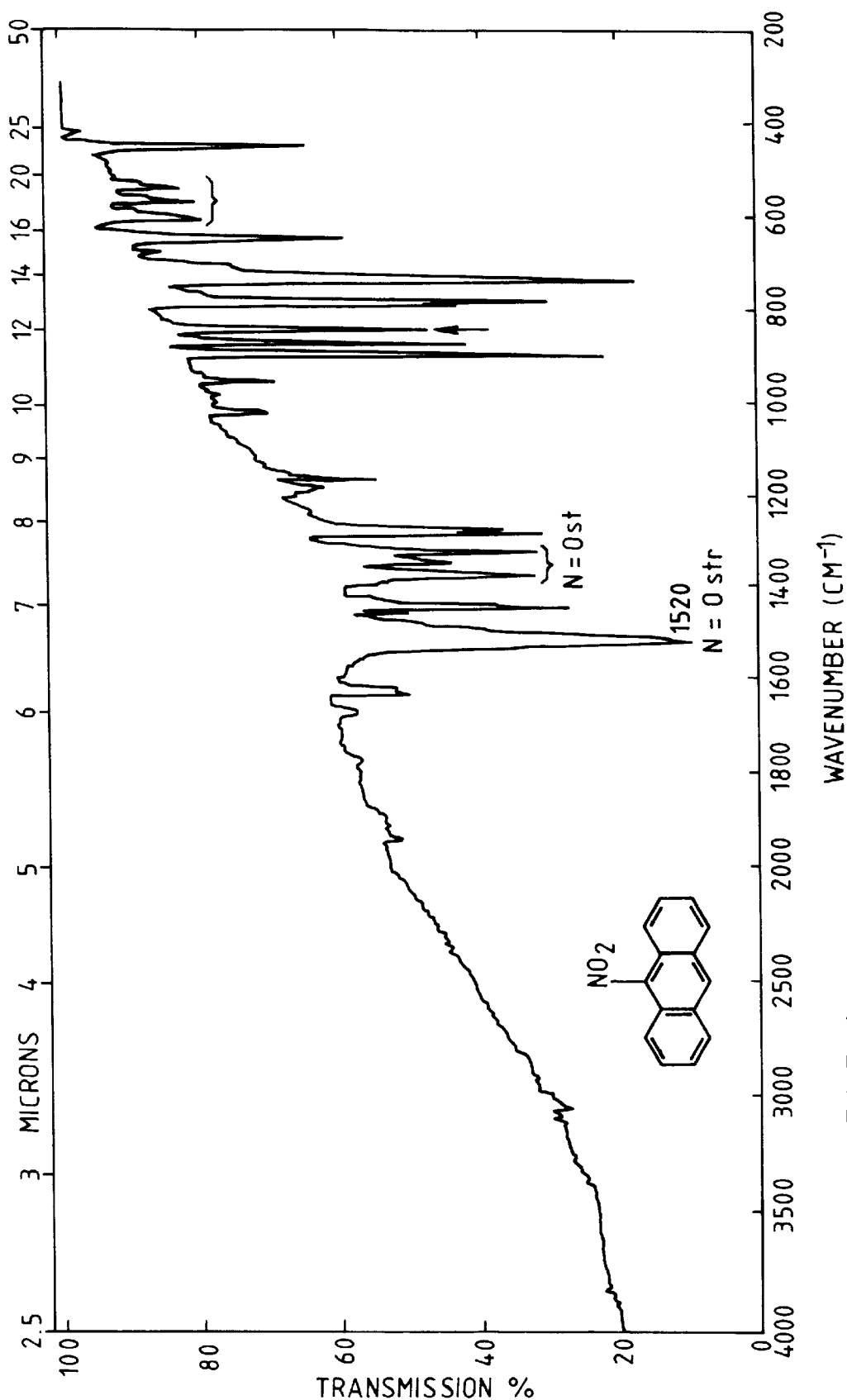
FIG. 1 is an IR spectrum of 9-nitroanthracene on a KBr disc.

IR: $\gamma_{max}$ (KBr disc): 1520 (N=O), 1450, 1380, 1320, 900, 840 and 730 cm$^{-1}$ (see FIG. 1 for IR spectrum of 9-nitroanthracene). $\delta$(270 MHz) $^1$H NMR(ppm): 8.35(s, 1H), 7.85(m, 4H), 7.51(t, 2H, J 7.6 Hz), 7.39(t, 2H, J 7.5 Hz). 13C NMR(6 ppm): 143.9(1C, CNO$_2$), 130.4(2C) 128.7 (2C), 128.2(2C), 125.9(2C), 122.3(2C) and 121.1(2C).

EXAMPLE 2

Synthesis of 9-aminoanthracene.

9-Nitroanthracene (9.98 g; 0.045 mole) (as made in Example 1) in glacial acetic acid (200 ml) was warmed at 70–80° C. for 1 hr and 30 minutes until it was completely dissolved. To the homogeneous solution was added tin (II) chloride (42.5 g; 0.224 mole; 5 mole equiv.) in concentrated HCl (150 ml) at 70° C. via a dropping funnel. A yellow precipitate started to form after the addition of about 75 ml of tin (II) chloride in conc. HCl. The rest of the solution was added and the solution stirred at 80° C. for a further half-an-hour and then cooled to room temperature. The light yellow solid was filtered off, washed with small amounts of conc. HCl and suction dried.

Figure 2:
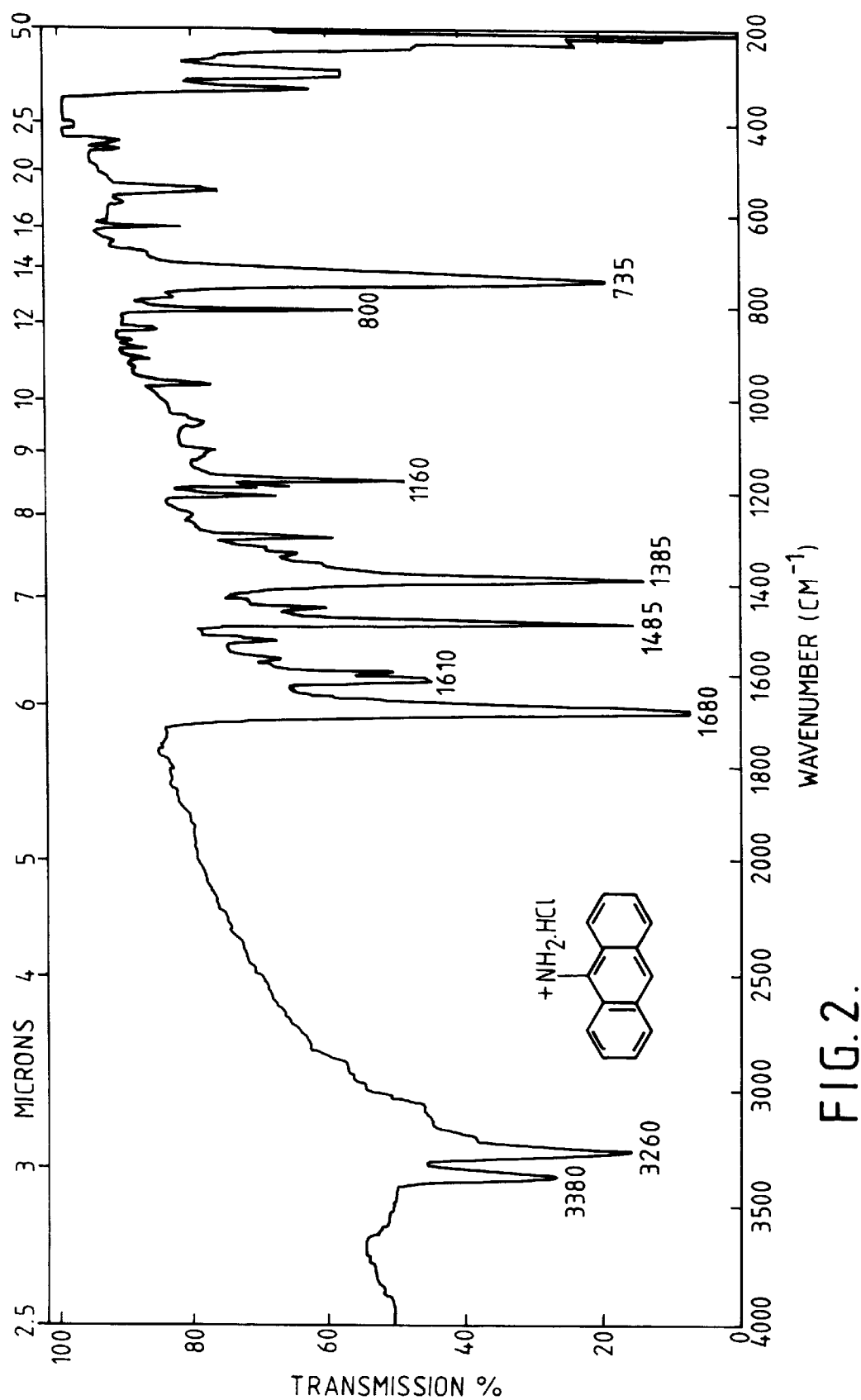
FIG. 2 is an IR spectrum on a KBr disc of 9-aminoanthracene hydrochloride before the neutralisation with 5% NaOH solution.

IR (KBr disc) of 9-aminoanthracene hydrochloride: $\gamma_{max}$ 3380, 3260, 1680, 1610, 1485, 1385, 1160, 800 and 735 cm$^{-1}$ (see FIG. 2 for the IR spectrum of the 9-aminoanthracene salt). The peak at 1680 cm$^1$ is characteristic of an amino salt, but the absence of the characteristic cluster of four peaks between 1300 and 1350 cm$^{-1}$ confirms that no AQ is present. (Further analysis has revealed that this salt is in fact the tin hexachloride salt rather than the hydrochloride.)

The product was stirred at room temperature with 5% sodium hydroxide solution for about 15 minutes. Any granular brown solid was ground with a flat bottomed glass rod. The neutralised yellow solid was filtered off under suction and washed thoroughly with copious amounts of distilled water. The 9-AA was vacuum dried at 50° C. for 6 hours. Thin layer chromatography (t.l.c) of the product indicated that the product was pure.

Figure 3:
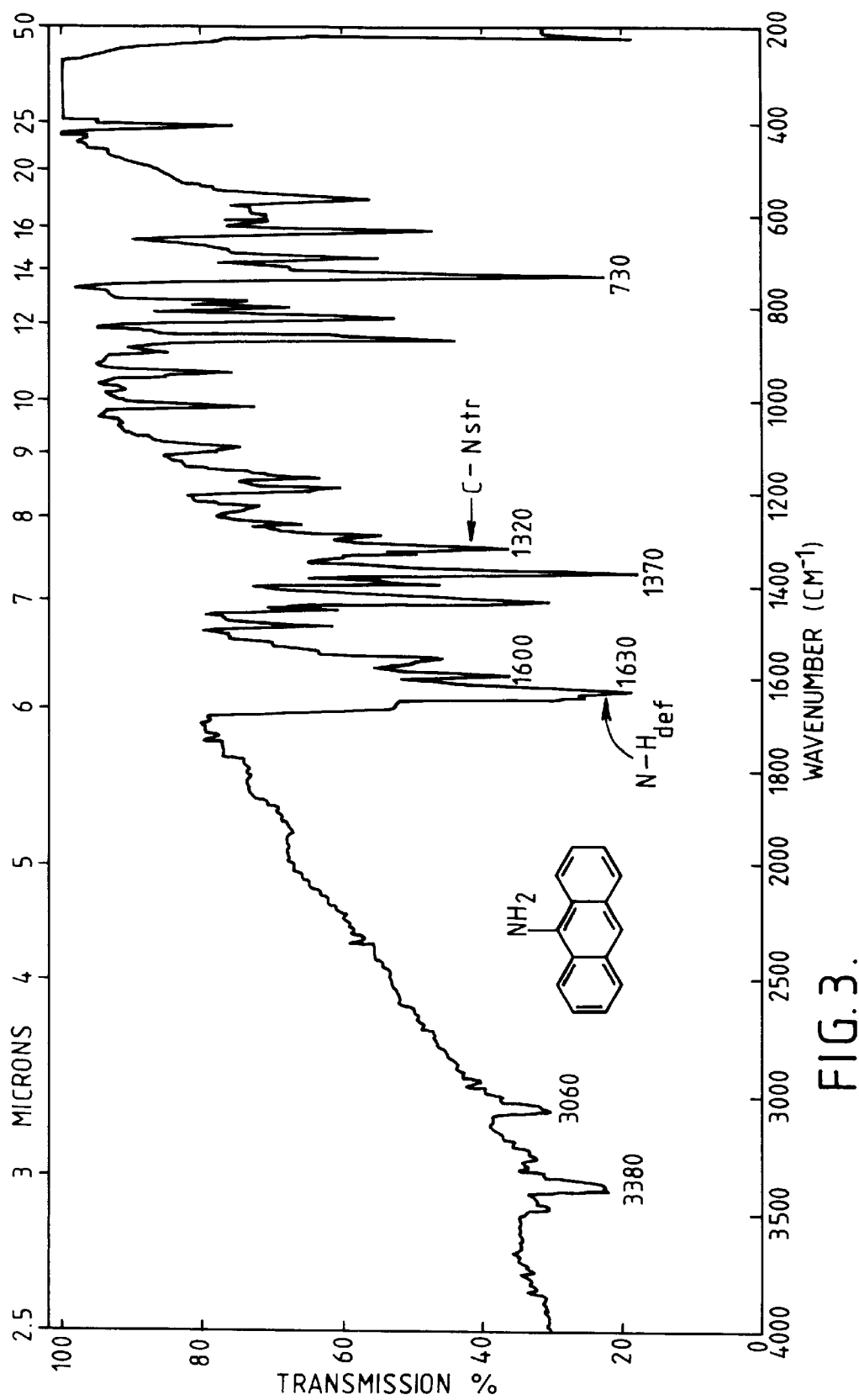
FIG. 3 is an IR spectrum on a KBr disc of 9-AA.

IR (KBr disc): $\gamma_{max}$ 3380, 3060, 1630 (d), 1600, 1370, 1320 (C—N) and 730 cm$^{-1}$ (see FIG. 3 for the IR spectrum of 9-AA).

$^1$H NMR (300MHz), $\delta$: 4.79 (br s, 2H, NH), 7.39 (m, 4H), 7.85 (s, 1H) and 7.90 (dd, 4H, J 1.3 and 8.3 Hz); Mass m/z (mass/charge) (%): 193 (100, M$^+$), 179 (6) and 165 (21).

EXAMPLES 3 to 9

Preparation of polymers

EXAMPLE 3

Synthesis of P9-AA by aerial oxidation

Typical procedure:

The 9-AA salt prepared as an intermediate in example 2 (10.0 g; 0.044 mole) was mechanically stirred while 5% ammonia was slowly added. The mixture became dirty green in colour when the pH of the solution was in the range 1.5 to 2.0. The suspension was stirred at this pH for 15 minutes and then further ammonia was added until the pH was in the range 5.8 to 6.0.

The solution was maintained at a pH of 5.8 to 6.0 with stirring for about 3 hours. (We have found that so long as this step of maintaining the solution at a mildly acidic pH is carried out for at least 2 and preferably at least 3 hours e.g. 3 to 6 hours at room temperature, satisfactory polymer is produced and the colour change is not necessarily observed).

Further ammonia solution was then added until excess was present and the pH of the solution was in the range 8.5 to 9.0. The coloured solution subsequently turned yellow in colour and a yellow solid was formed. The solid was filtered under suction and washed thoroughly with distilled water and dried under vacuo and 60° C. for 6 hours. The yield was 8.8 g.

The yellow solid (5.0 g) was taken up in chloroform (200 ml) and refluxed for 4 hours, cooled to room temperature and the insoluble solid was filtered off. The solid was again taken up in chloroform (150 ml), refluxed for a further 3 hours and filtered off under suction. The filtrates were combined and the solvent removed in the rotary evaporator. Both the products were dried under vacuo at 50° C. for 6 hours. The chloroform insoluble white solid (3.4 g) was identified as P9-AA and the solid from the chloroform soluble fraction as neutral 9-AA (1.4 g).

The electrical conductivity of the P9-AA was $1.3 \times 10^{-3}$ to $8.5 \times 10^{-4}$ S cm$^{-1}$, as measured by the 4 probe method. A thin film of P9-AA made from methanolic HCl on a glass microscope slide exhibited a transmittance of 52% in the region 400–800 nm (the thickness of the thin film was 7 $\mu$m). It will be appreciated that this is a relatively thick film and at a thickness of 100 nm, the transmission can be expected to be higher. The volume conductivity of the thin film was $9.2 \times 10^{-3}$ S cm$^{-1}$.

Thermogravimetric analysis of this pure P9-AA showed a weight loss of 14% at 600° C. under nitrogen.

The solubility was 0.75% in N,N-dimethylformamide (DMF), N-methyl pyrrolidinone (NMP) and 1,1,1,3,3,3-hexafluoro-2-propanol (HFP).

P9-AA exhibited a narrow molecular weight distribution and has a number average ($M_n$) and weight average ($M_w$) molecular weight each of about 27,000 as determined by gel permeation chromatography (poly styrene as standard) in dimethyl formamide, indicating a polydispersity close to 1.

Figure 4:
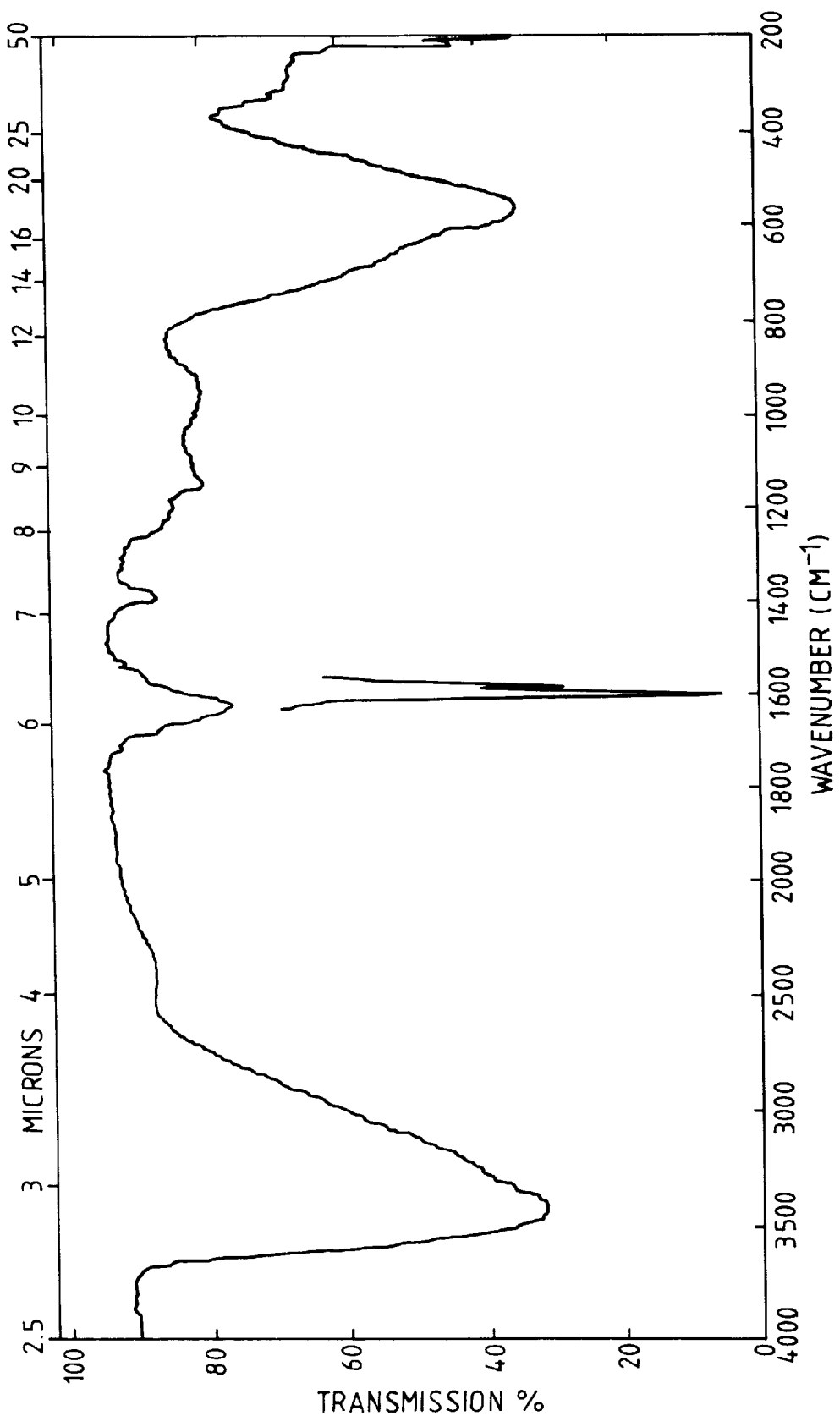
FIG. 4 is an IR spectrum on a KBr disc of P9-AA prepared by aerial oxidation.
Figure 5:
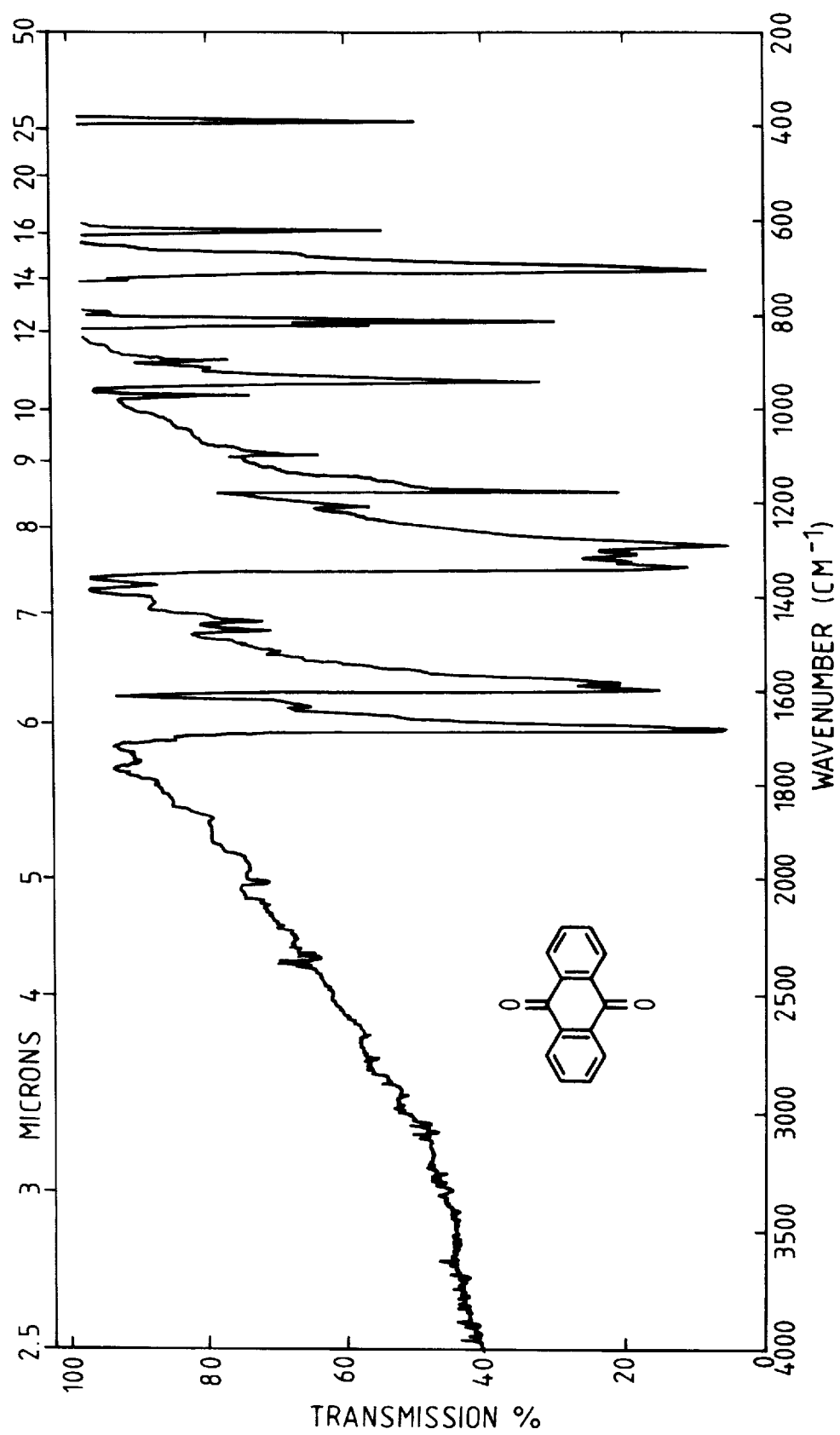
FIG. 5 is an IR spectrum on a KBr disc of AQ.

The IR (KBr disc) spectrum of the P9-AA (see FIG. 4 gave broad absorptions at $\gamma_{max:}$ 3000 (br, NH), 1635 (C=N), 1400 (C—H) and 600 (Ar) cm$^{-1}$. It will be noted that there is no peak at 1680 cm$^{-1}$ nor a cluster of peaks between 1300 and 1350 cm$^{-1}$, all of which are characteristic of the presence of AQ (see FIG. 5). It can therefore be concluded that the P9-AA produced is free of the competing product AQ.

Solid state $^1$H NMR was not very informative but the solid state $^{13}$C NMR showed broad signals at $\delta$ ppm: 65.0, 72.9, 88.5, 97.6, 104.9, 118.9, 127.6 and 166.7.

EXAMPLE 4

Chemical oxidative polymerisation of 9-AA using Fe(III) Chloride in chloroform 9-AA (0.5 g, 2.59 mmol) (see Example 2) was dissolved in dry chloroform/methanol mixture (2:1; 75 ml) and added to a stirred solution of anhydrous iron (III) chloride (1.68 g; 10.36 mmol) in dry chloroform (50 ml). The solution was stirred and refluxed under nitrogen for 8 hours and then stirred at room temperature overnight. Most of the solvent was removed by evaporation and methanol (200 ml) was poured into the residue. The solid which separated out was filtered off under suction. The product was again taken-up in methanol-water (1:1; 50 ml) and refluxed for 6 hours. The cooled solution was filtered off, washed well with cold methanol until the washings did not show any coloration with ammonium thiocyanate which showed that the solid was free of iron. The polymeric product was dried under vacuo at 50° C. (yield 0.1 g).

Figure 6:
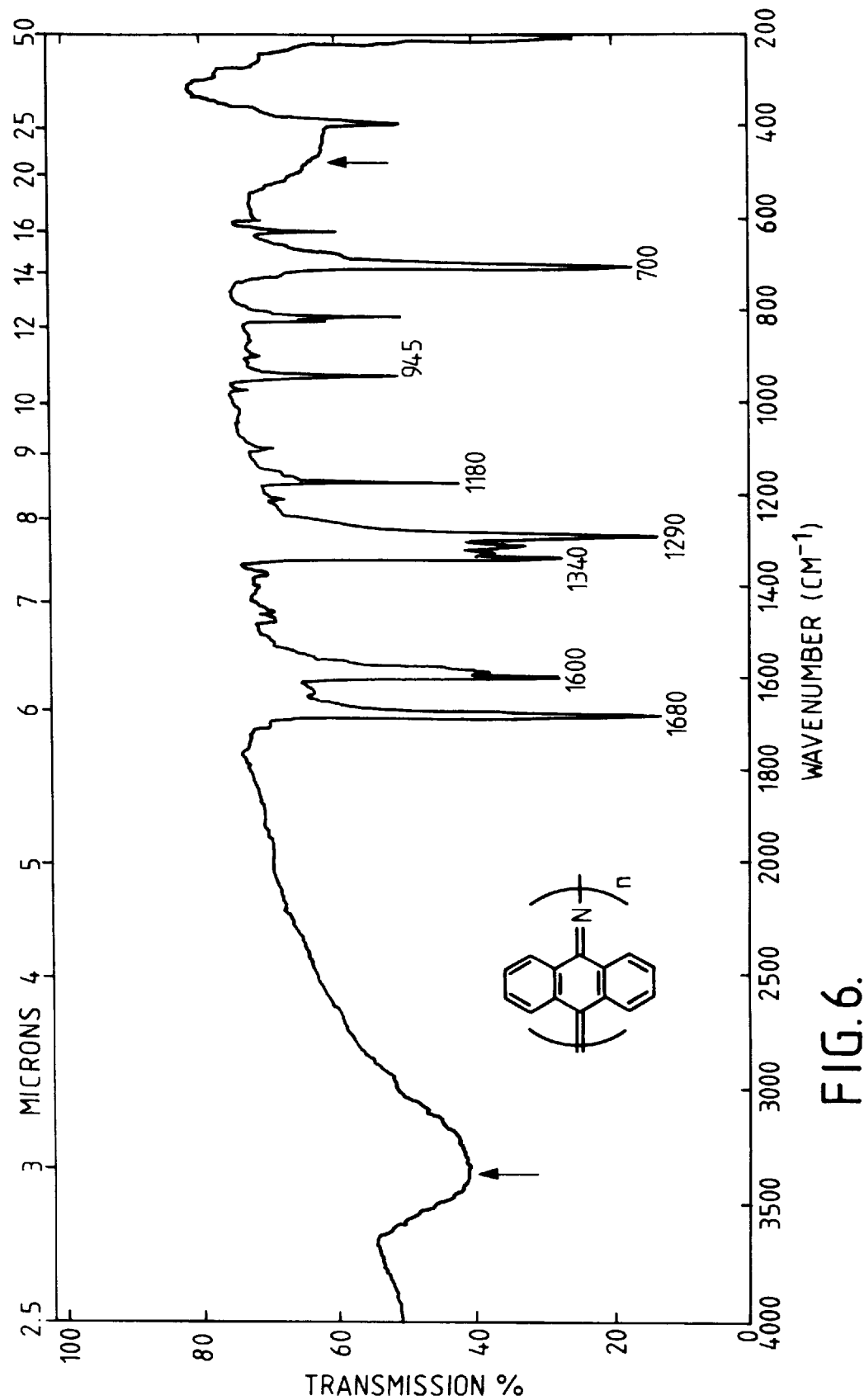
FIG. 6 is an IR spectrum on a KBr disc of P9-AA prepared by reaction of 9-AA with iron (III) chloride in chloroform.

From FIG. 6 it will be noted that there is a peak at 1680 cm$^{-1}$ and the characteristic cluster of 4 peaks between 1300 and 1350 cm$^{-1}$ indicating the presence of AQ in the mixture. However, the conductivity, solubility and transmissivity properties of this mixture make it suitable for use as an anti static surface coating.

The conductivity was $2.0 \times 10^{-4}$ S cm$^{-1}$ and the transmittance was 80% in the visible region. The solubility was 0.75% in DMF, NMP and HFP.

EXAMPLE 5

Chemical oxidative polymerisation of 9-AA using iron (III) chloride in methanol

To a suspension of anhydrous iron (III) chloride (3.36 g; 0.021 mole) in methanol (100 ml) was added slowly 9-AA (1.0 g; 0.0052 mole) (see Example 2) in methanol (50 ml). The solution was stirred at room temperature for 18 hours and then refluxed for 6 hours. A pale greenish yellow solid precipitated out when the solution was cooled to room temperature. This was filtered off and then again taken-up in methanol (100 ml) and refluxed for 4 hours. A pale brown solid was filtered off and dried under vacuo at 50° C. for 6 hours. Yield 0.16 g.

Figure 7:
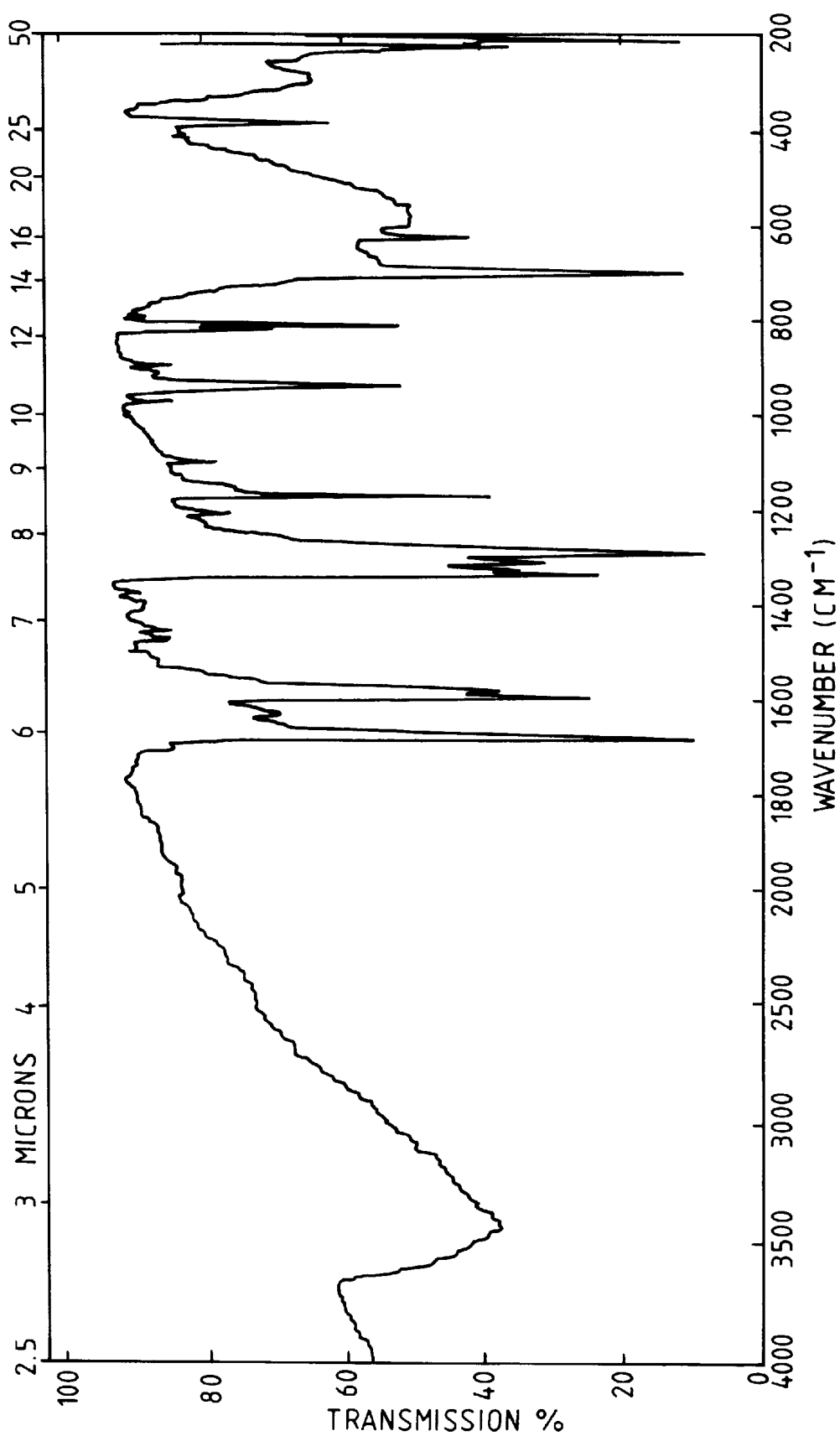
FIG. 7 is an IR spectrum on a KBr disc of P9-AA prepared by reaction of 9-AA with iron (III) chloride in methanol.

FIG. 7 again shows a peak at 1680 cm$^{-1}$ and the cluster of 4 peaks between 1300 and 1350 cm$^{-1}$ indicative of the presence of AQ in the mixture.

Conductivity, solubility and transmittance data is given in Table I.

The P9-AA was ground with 5-sulphosalicylic acid (100 mg) and electrical conductivity was measured on the standard compacted disc by the four-probe method described above. The conductivity was $1.2 \times 10^{-4}$ S cm$^{-1}$ and the transmittance was 72%. The solubility was 1.2% in DMF, NMP and HFP.

EXAMPLE 6

Chemical oxidative polymerisation of 9-AA using iron (II) sulphate and hydrogen peroxide.

To a mixture of acetonitrile (100 ml) and 9-AA (1.0 g; 0.0052 mole) (see Example 2) in a three-necked flask was added slowly distilled water (100 ml) and Conc. H$_2$SO$_4$ (3.0 ml). To the homogeneous solution at room temperature FeSO$_4$.7H$_2$) (100 mg; 0.36 mmol) was added with vigorous stirring followed by 30% H$_2$O$_2$ (2.0 ml). The solution became reddish orange in colour. The reaction mixture was vigorously stirred continuously for 22 hours. The solid which separated out was filtered off, washed well with water and dried under vacuo at 50° C. for 6 hours. Yield obtained 0.19 g.

Figure 8:
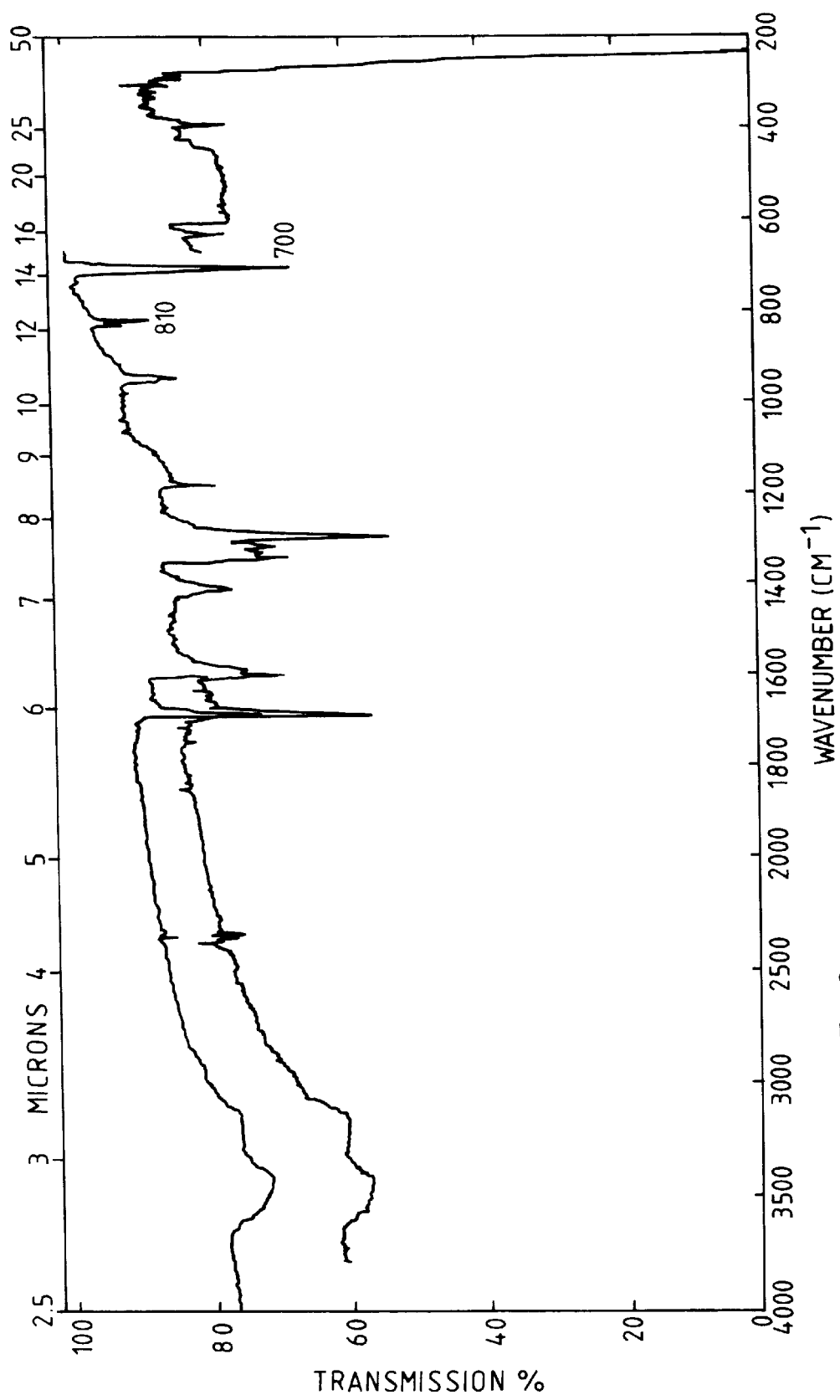
FIG. 8 is an IR spectrum on a KBr disc of P9-AA prepared by the reaction of 9-AA with iron (II) sulphate and hydrogen peroxide.

FIG. 8, the IR spectrum, shows a peak at 1680 cm$^{-1}$ and the cluster of 4 peaks between 1300 and 1350 cm$^{-1}$ characteristic of AQ.

The polymer was doped with 5-sulphosalicylic acid to give a conductivity of $3.1 \times 10^{-5}$ S cm$^{-1}$ using the four-probe technique.

Transmittance and conductivity data are given in Table I. The solubility was 2.2% in DMF, NMP and trifluoroacetic acid (TFA).

As compared with example 3, the procedures of examples 4, 5 and 6 have the disadvantage of producing a waste product, AQ, which cannot be recycled and moreover is much less valuable than the 9-AA starting material.

In addition, AQ is much less soluble than 9-AA and thus P9-AA contaminated with AQ is much more difficult to purify than is P9-AA containing unreacted 9-AA starting material. There is therefore the risk that P9-AA made by the routes of examples 4, 5 and 6 will contain larger and less controllable amounts of impurity than the P9-AA made by example 3.

Comparative Example 1

Chemical oxidative polymerisation of 1-aminoanthracene

To a mixture of $CH_3CN$ (80 ml) and 1-aminoanthracene (0.27 g, 1.4 mmol) in a 350 ml round bottom flask was added dropwise distilled water (80 ml) and sulphuric acid (0.68 ml, 12 mmol). With the resulting solution remaining at 30° C., powdery $FeSO_4.7H_2O$ (10 mg, 0.036 mmol) was added with vigorous stirring, and then 31% $H_2O_2$ (0.5 ml, 4.5 mmol) was slowly added to the solution. The reaction mixture was agitated continuously for 22 hours under air at 30° C. to cause precipitation of a brown solid. The product was quenched with ice water, and the solid was collected on a filter and washed with methanol with 28% aqueous ammonium and then with methanol several times. Finally it was dried in dynamic vacuum at room temperature to give poly(1-aminoanthracene) (P1-AA) as a brown solid in 90% yield.

Figure 9:
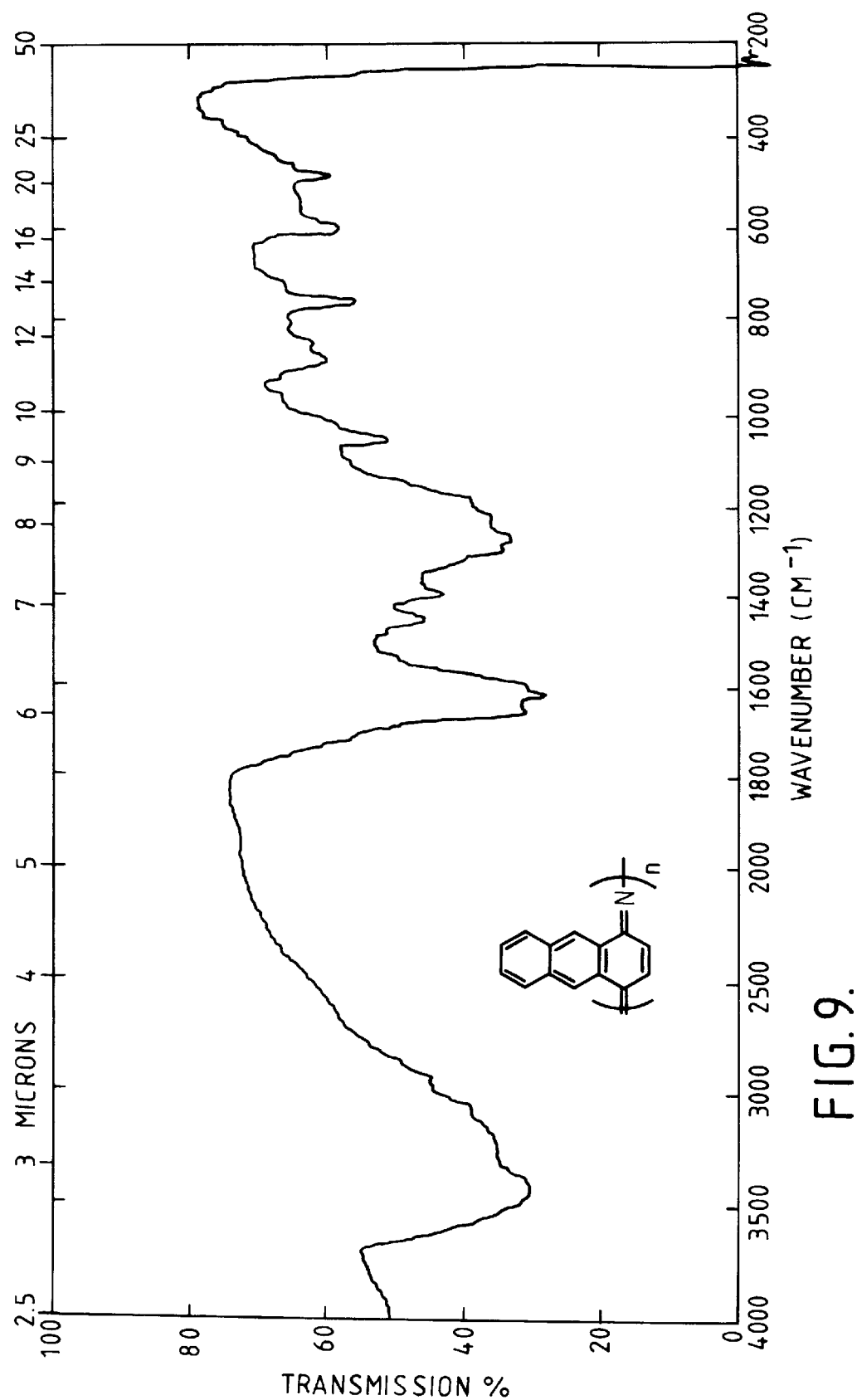
FIG. 9 is an IR spectrum on a KBr disc of P9-AA prepared according to the Yamamoto method.

FIG. 9 shows the IR spectrum for P1-AA and there is no peak at 1680 $cm^{-1}$ and no cluster of 4 peaks between 1300 and 1350 $cm^{-1}$.

The conductivity was $1.0 \times 10^{-5}$ S $cm^{-1}$ and the transmittance was 32% at 1.5 microns thickness. The solubility was 0.6% in NMP, DMF and HFP.

The polymer was doped with 5-sulphosalicylic acid to give a conductivity of $1.8 \times 10^{-5}$ S $cm^{-1}$ using the four-probe technique. Conductivity and transmittance data given in table I.

EXAMPLE 7

Electropolymerisation of 9-AA

Electropolymerisation of 9-AA (0.05M) was carried out in nitrobenzene at 0° C., using tetrabutylammonium perchlorate [$NBu_4ClO_4$] (0.05M) as the supporting electrolyte. 9-AA (0.39 g) and [$NBu_4ClO_4$] (7.0 g) were dissolved in nitrobenzene (40 ml) and cooled in an ice-water bath. A 3×3 $cm^2$ Pt flag electrode was used as the anode and a Pt wire electrode as the cathode and a constant potential of 0.85 V relative to Ag/AgCl was supplied using a Ministat Precision Potentiostat for 6 hours. The anode carrying the deposited polymer was washed with chloroform, dried and the polymer scraped off from the electrode. The electrolyte solution was further electropolymerised in the same manner for 18 hours.

Figure 10:
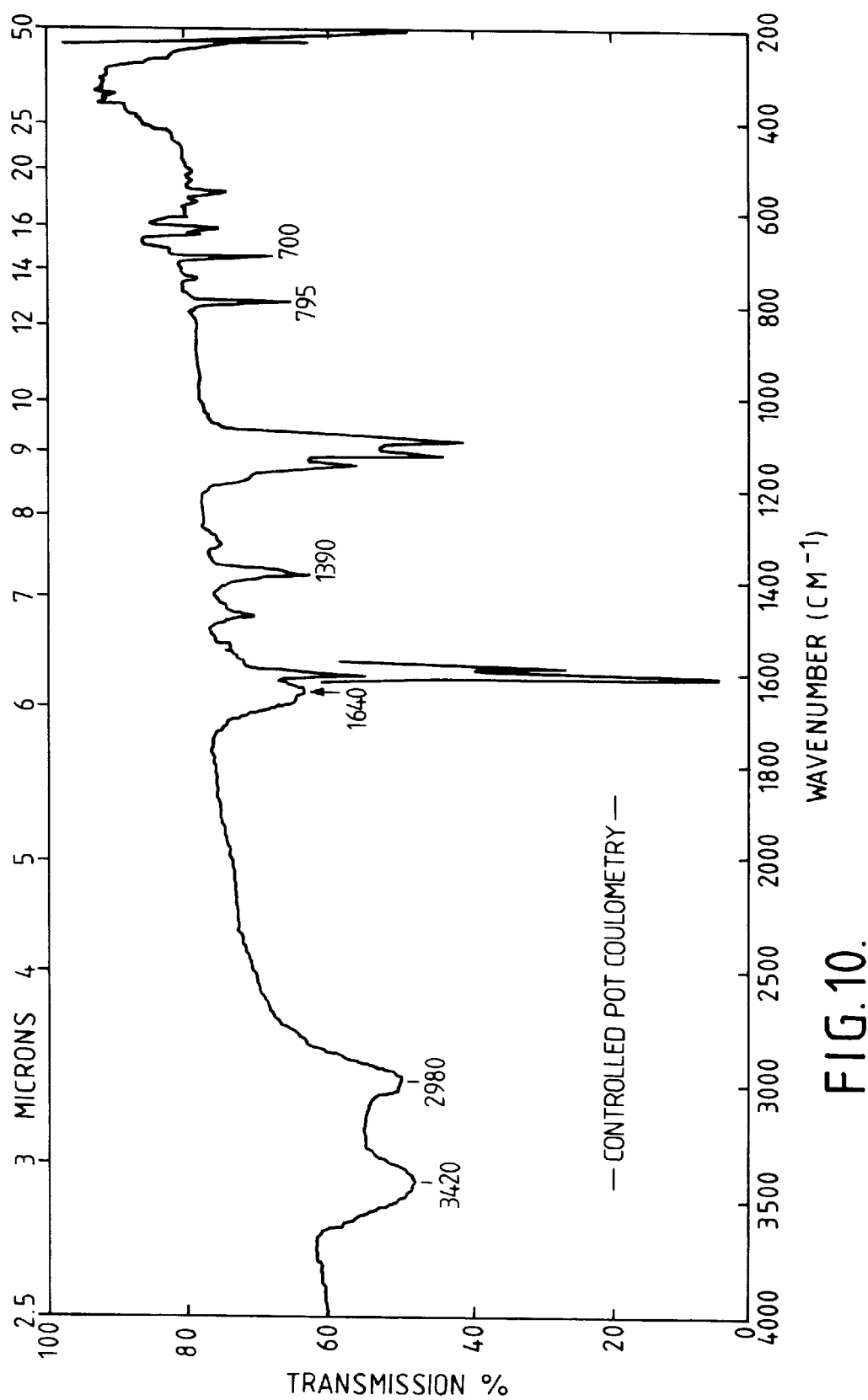
FIG. 10 is an IR spectrum on a KBr disc of P9-AA prepared by electropolymerisation at constant voltage.

FIG. 10 shows the IR spectrum for the product produced by this electropolymerisation at constant voltage. As can be seen, there is no peak at 1680 $cm^{-1}$ and no cluster of 4 peaks between 1300 and 1350 $cm^{-1}$. This indicates that there is no AQ present in the product.

Figure 11:
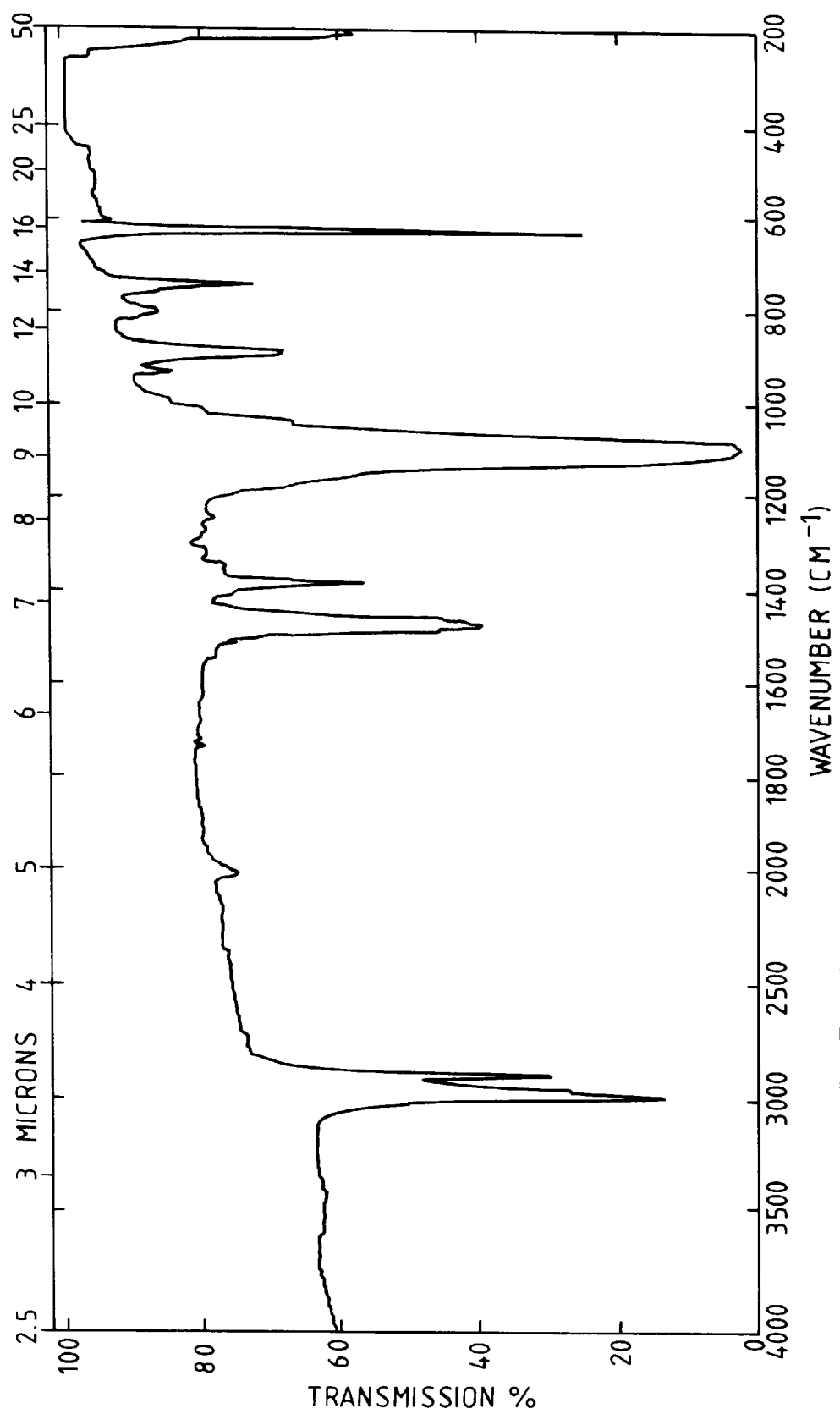
FIG. 11 is an IR spectrum on a KBr disc of tetrabutylammonium perchlorate [$NBu_4ClO_4$] which is used as the supporting electrolyte in the electropolymerisation reactions.

An IR spectrum of the tetrabutylammonium perchlorate [$NBu_4ClO_4$] is included as FIG. 11. Again, it will be noted that there are no peaks at 1680 $cm^{-1}$ nor in the range 1300 to 1350 $cm^{-1}$. This is significant since these two regions are being used to determine the presence or absence of AQ.

Conductivity was measured on a compacted disc from the collected P9-AA sample using the standard 4 probe technique giving a value of $<10^{-8}$ S $cm^{-1}$.

EXAMPLE 8

Figure 12:
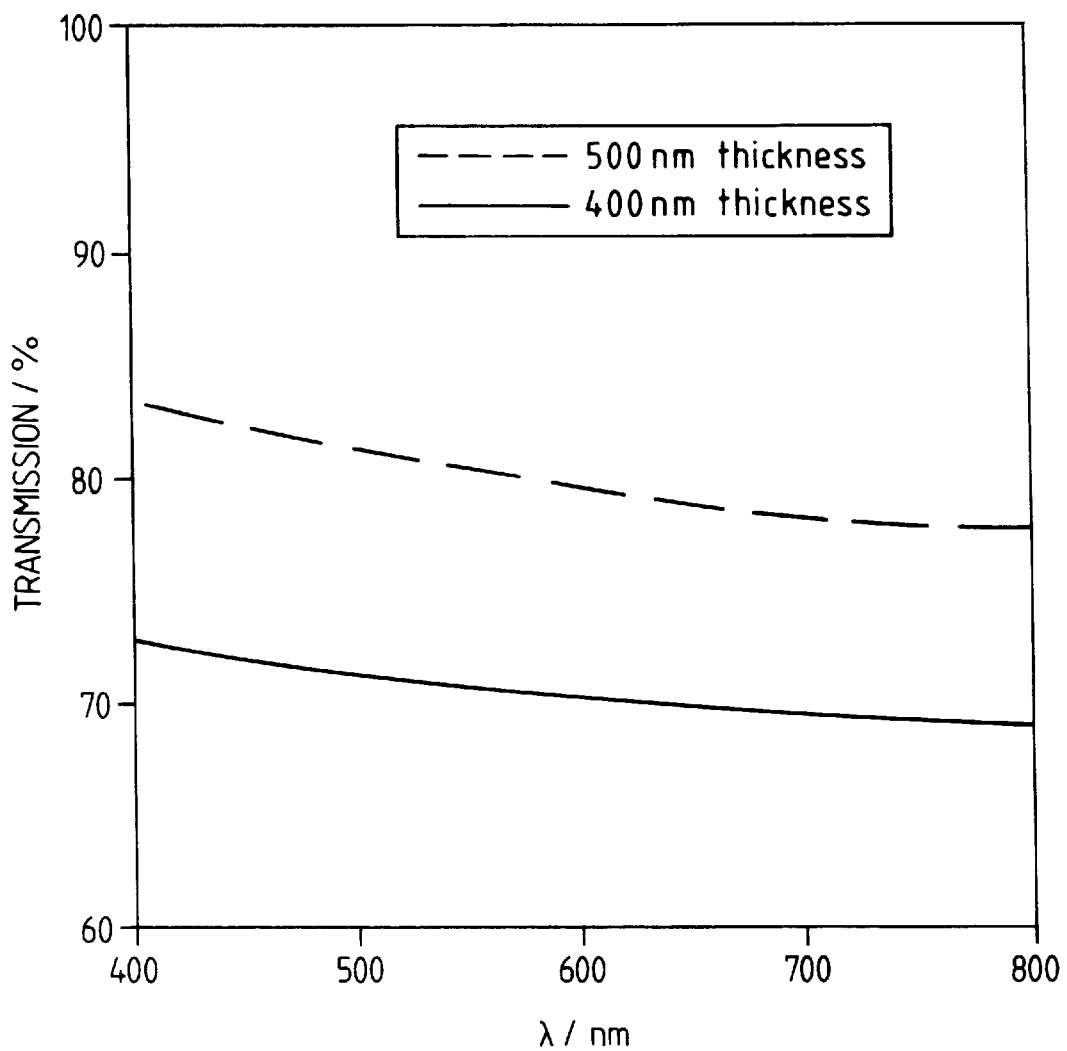
FIG. 12 is a graph of the transmissions of the samples of 400 and 500 nm thickness prepared by electropolymerisation at constant current.
Figure 14:
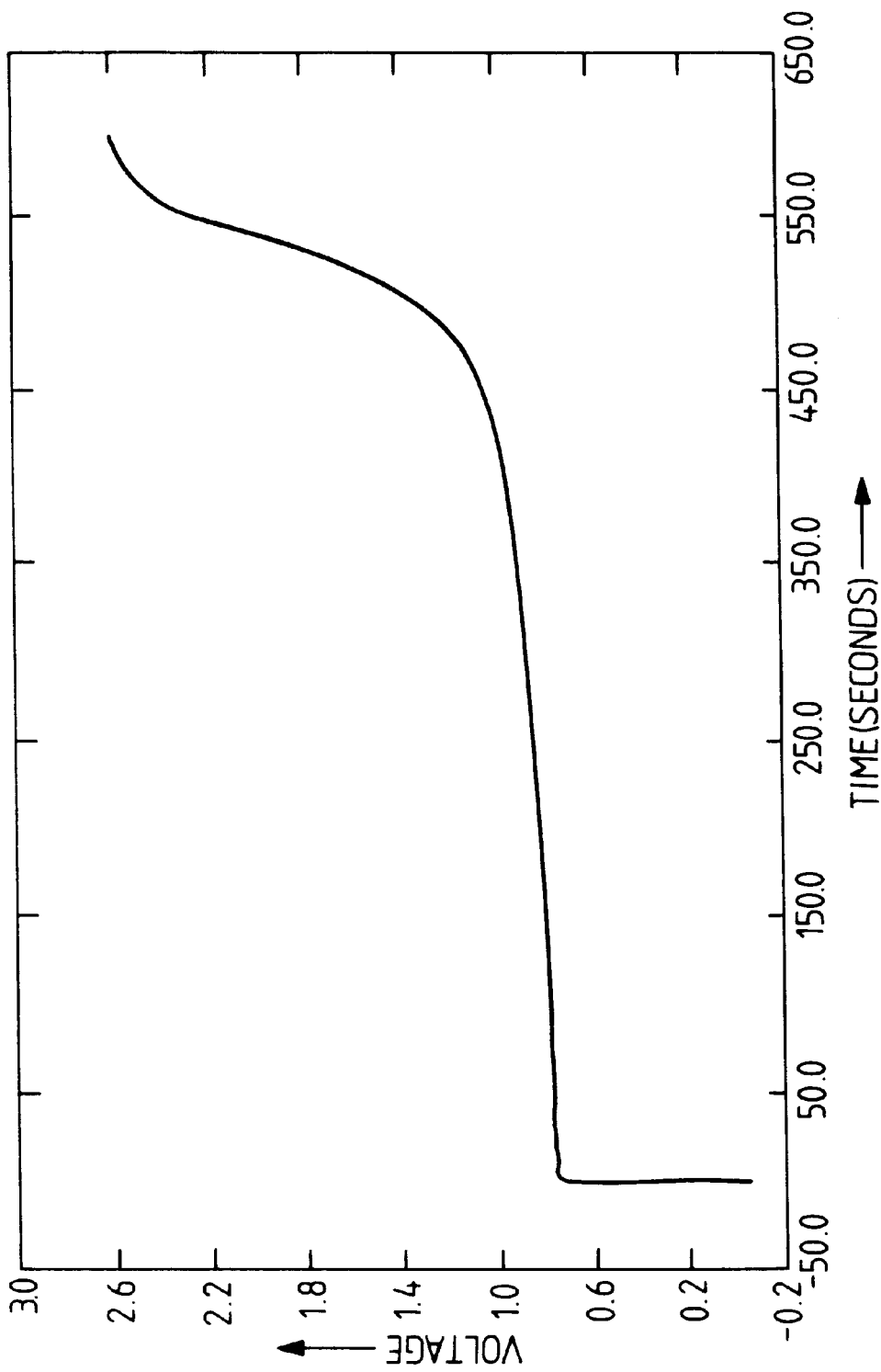
FIG. 14 is a graph showing the production of a deposit and how the voltage varied with respect to time for the electropolymerisation at constant current, a chronopotentiometric procedure.
Figure 15:
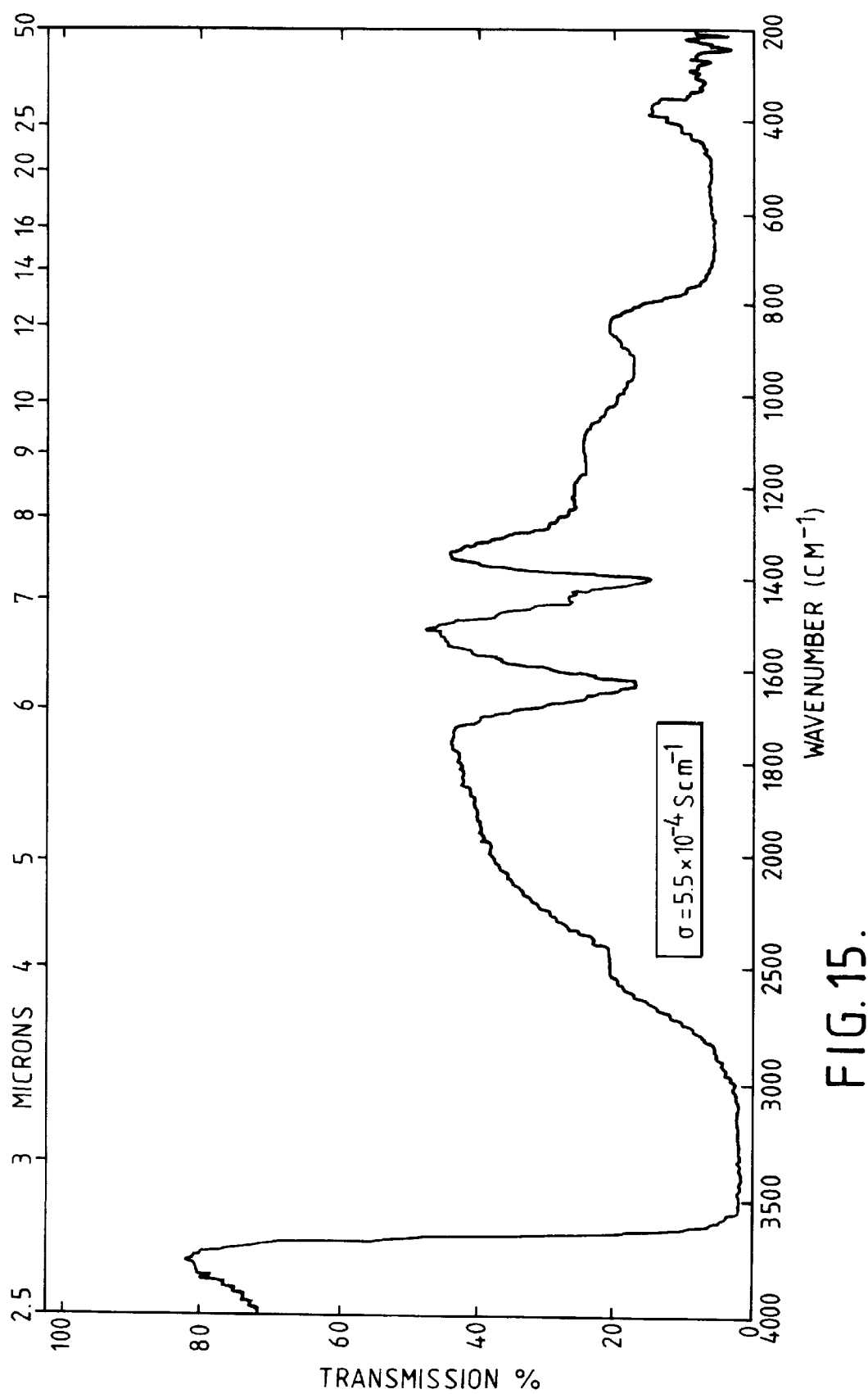
FIGS. 15 and 16 are IR spectra on a KBr disc of P9-AA made by the method of Example 3 (FIG. 15) and mixed with 50% of AQ (FIG. 16) as specified in Table 2.
Figure 16:
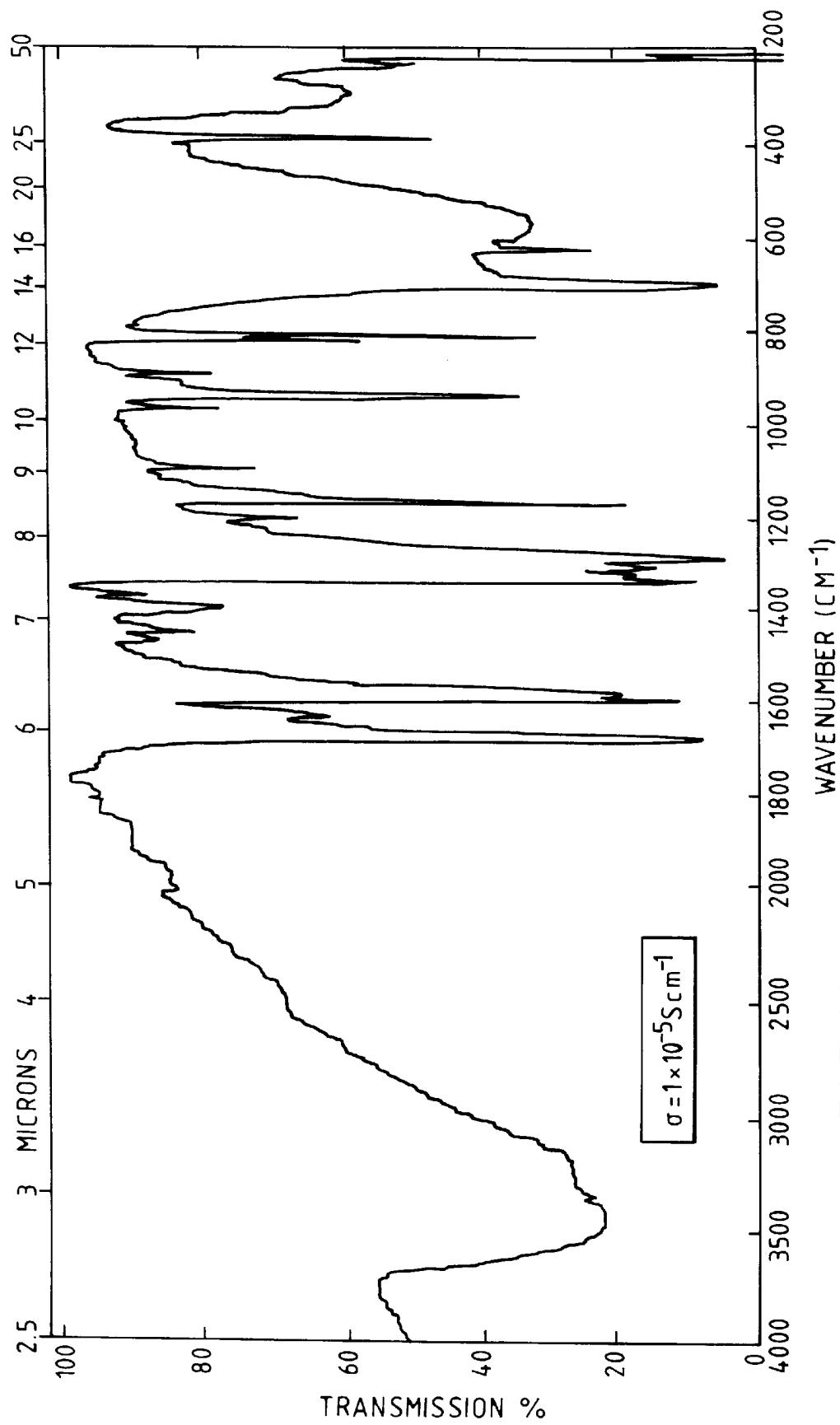

Electrochemical polymerisation of 9-AA at constant current 0.482 g (0.025M) 9-AA and 3.42 g (0.1M) tetrabutylammonium perchlorate [$NBu_4ClO_4$] were mixed. This was added to 100 ml of ortho-dichlorobenzene and was electropolymerised using a constant current of 0.5 mA using a platinum wire counter electrode and a 3 $cm^2$ ITO plate as the electrode on which the polymer was deposited. FIG. 14 is a chronopotentiometric plot of the deposition of P9-AA. It shows the variation of voltage with time at constant current during the deposition of the polymer film. FIG. 12 shows the transmission values for 2 samples at 400 and 500 nm thick. The film at 500 nm thickness (measured by Atomic Force microscope) showed a transmittance of 80% in the range 400–800 nm (see FIG. 12). The volume conductivity was 0.1 S $cm^{-1}$ in the unprotonated form (i.e. in the undoped form) using the standard four probe cell applied to the surface of the P9-AA deposit.

EXAMPLE 9

Figure 13:
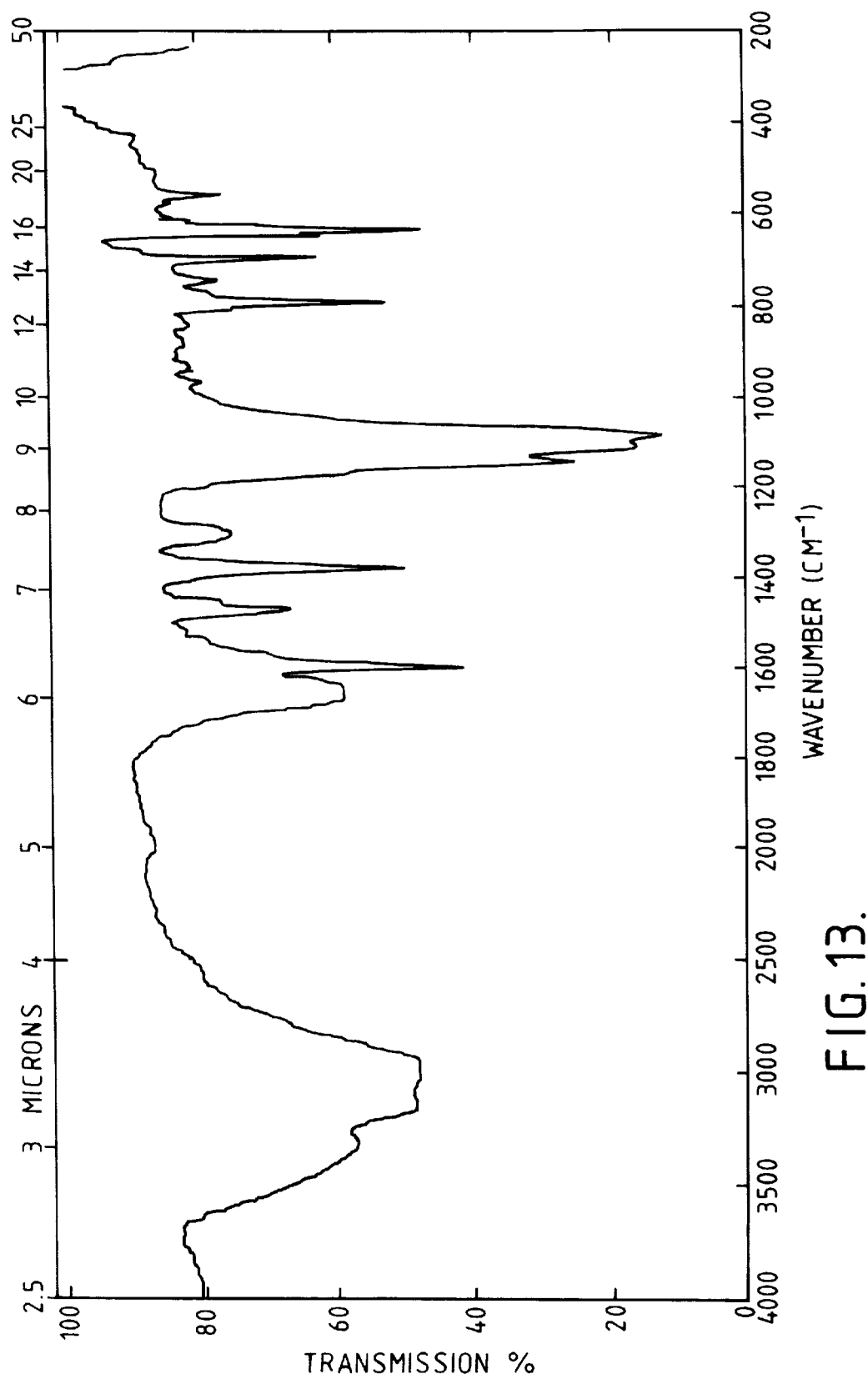
FIG. 13 is an IR spectrum on a KBr disc of P9-AA prepared by electropolymerisation at constant current.

Example 8 was repeated using a 3×3 cm platinum flag working electrode (as in example 7). A beige/cream solid was scraped off and an IR spectrum was taken (see FIG. 13) using a KBr disc. It will be observed that the polymer is free of AQ, there being no peak at 1680 $cm^{-1}$ and no cluster of peaks between 1300 to 1350 $cm^{-1}$. The undoped P9-AA had a bulk electrical conductivity measured by the standard four probe method with a compacted disc as described above of $9.6 \times 10^{-3}$ to $8.1 \times 10^{-4}$ S $cm^{-1}$. The material had a solubility of about 2% (w/v) in acetone and in acetonitrile.

EXAMPLES 10 to 12

Doping of P9-AA

EXAMPLE 10

With camphorsulphonic acid

P9-AA (0.30 g) (made as in example 4) was refluxed with 1 mole equivalent of camphorsulphonic acid (0.36 g) in methanol-water (2:1; 30 ml) for 6hrs and stirred at room temperature overnight. The pale yellow powder which precipitated out, was filtered out, washed with methanol and dried under vacuo at 80° C. for 4 hrs. Electrical conductivity of the doped polymer was $1.5 \times 10^{-3}$ S $cm^{-1}$ measured by the four-probe method on the standard compacted disc as described above.

EXAMPLE 11

With para-toluenesulphonic acid

P9-AA (0.30 g) (made as in example 4) was refluxed with 1 mole equivalent of p-toluenesulphonic acid (0.29 g) in methanol-water (2:1; 30 ml) for 6 hours and stirred at room temperature overnight. The solids were worked up as described in example 10 and then the conductivity was measured as described above. Conductivity of the compacted disc was $2.6 \times 10^{-4}$ S $cm^{-1}$.

EXAMPLE 12

With 5-sulphosalicylic acid.

Powdery P9-AA (0.18 g) (made as in example 4) was stirred at room temperature with 5-sulphosalicylic acid dihydrate (0.47 g) in acetone (25 ml) overnight. The doped polymer was filtered under suction and dried under vacuo at 50° C. for 4 hours. Electrical conductivity was $1.2 \times 10^{-4}$ S $cm^{-1}$, measured by the standard four-probe method on the standard compacted disc.

Table 1 summarises conductivity, transmittance and solubility values of various polyaminoanthracenes.

TABLE 1

Properties of Poly(aminoanthracenes)

| Ex | Compound | Oxidant | Colour | C | S | T |
|---|---|---|---|---|---|---|
| 3 | P9-AA (pure) | aerial oxidation | white | $9.2 \times 10^{-3}$ | 0.75 (1) | 52 |
| 4 | P9-AA + AQ | $FeCl_3$ in $CHCl_3$ | brown | $2.0 \times 10^{-4}$ | 0.75 (1) | 80 |
| 5 | P9-AA + AQ | $FeCl_3$ in methanol | pale brown | $<1.0 \times 10^{-8}$ | 1.2 (1) | 64 |
| 5 | Doped P9-AA + AQ | Dopant: 5-SSA | yellowish brown | $1.2 \times 10^{-4}$ | 1.2 (1) | 72 |
| 6 | Doped P9-AA + AQ | $H_2O_2$/ $FeSO_4.7H_2O$. Dopant: 5-SSA | pale brown | $3.1 \times 10^{-5}$ | 2.2 (2) | 68 |
| 7 | P9-AA (pure) | electropolymerisation | | $<10^{-8}$ | (4) | (4) |
| 8 | P9-AA (pure) | electropolymerisation | | 0.1 | (4) | 80 |
| 9 | P9-AA | electropolymerisation | | $9.6 \times 10^{-3}$ to $8.1 \times 10^{-4}$ | 2.0 (3) | (4) |
| 10 | Doped P9-AA + AQ | $FeCl_3$ in $CHCl_3$ Dopant: CSA | light yellow-green | $1.5 \times 10^{-3}$ | | |
| 11 | Doped P9-AA + AQ | Dopant: TSA | | $2.6 \times 10^{-4}$ | | |
| 12 | Doped P9-AA + AQ | Dopant: 5-SAA | | $1.2 \times 10^{-4}$ | | |
| CE1 | P1-AA | $H_2O_2$/ $FeSO_4.7H_2O$. | black | $1.0 \times 10^{-5}$ | 0.6 (1) | 32 |
| CE1 | Doped P1-AA | $H_2O_2$/ $FeSO_4.7H_2O$. Dopant: 5-SSA | brown-black | $1.8 \times 10^{-5}$ | | 36 |

Notes on Table 1:
C = Conductivity (S cm$^{-1}$)
T = Transmittance of thin film (%) in the range 400–800 nm.
S = Solubility (% mass of polymer/volume of solvent)
5-SSA = 5-sulphosalicylic acid
CSA = camphorsulphonic acid
p-TSA = para-toluene sulphonic acid
(1) solubility in DMF, in NMP and in HFP
(2) solubility in DMF, in NMP and in TFA
(3) solubility in acetone and in acetonitrile
(4) not measured

EXAMPLES 13 to 21 preparation of mixtures of P9-AA with AQ

The volume conductivities of pure AQ (99% pure from Aldrich Chemicals) was measured using the standard four probe method with the standard compacted disc and it was found to be less than $10^{-8}$ S cm$^{-1}$ i.e. not measurable, no readings being obtained at any current in the range 0.1 microamp to 1 milliamp or voltage in the range 0.1 millivolt to 30 volts.

A freshly prepared sample of aerially oxidised P9-AA was made by the method of Example 3 (thus being free of AQ) and had a volume conductivity of $1.46 \times 10^{-3}$ S cm$^{-1}$. This was mixed intimately with the pure AQ powder and compressed into the standard discs and the volume conductivity of the mixtures was measured using the standard four probe method. Table 2 gives the proportions by weight in which the P9-AA and the AQ were mixed and the average conductivities at room temperature (20° C.), and identifies the IR spectra of the mixtures.

TABLE 2

| Ex. | P9-AA | AQ | Conductivity (S cm$^{-1}$) | IR spectra FIG. No. |
|---|---|---|---|---|
| 13 | 100 | 0 | $1.46 \times 10^{-3}$ | 15 |
| 14 | 75 | 25 | $1.08 \times 10^{-3}$ | — |
| 15 | 65 | 35 | $1.48 \times 10^{-4}$ | — |
| 16 | 50 | 50 | $3.96 \times 10^{-5}$ | 16 |
| 17 | 35 | 65 | $1.66 \times 10^{-4}$ | — |
| 18 | 30 | 70 | $<10^{-8}$ | — |
| 19 | 25 | 75 | $<10^{-8}$ | — |
| 20 | 20 | 80 | $<10^{-8}$ | — |
| 21 | 0 | 100 | $<10^{-8}$ | — |

Figure 17:
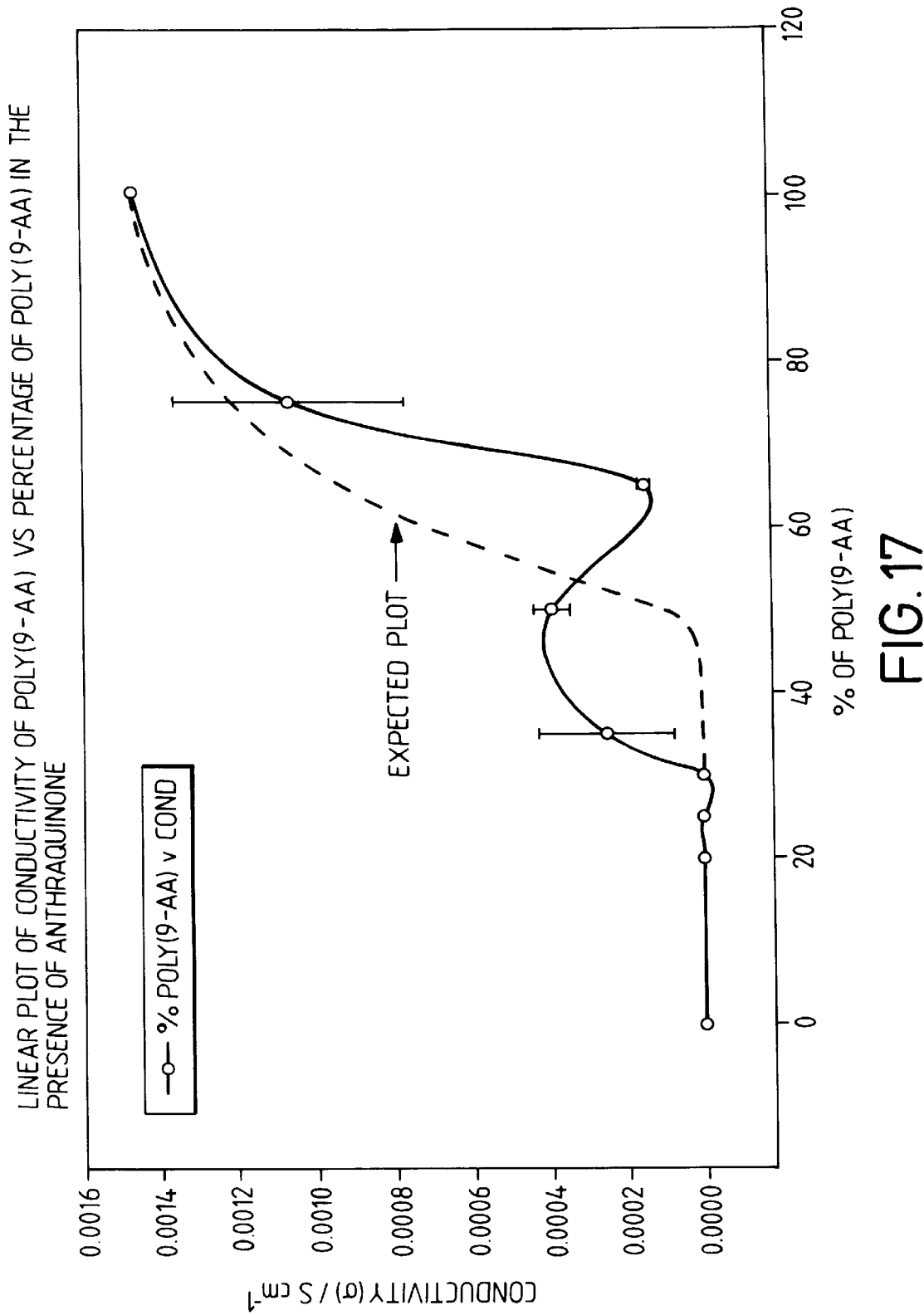
FIG. 17 is a linear plot of the conductivity of mixtures of P9-AA with AQ versus composition, the values being given in Table 2.
Figure 18:
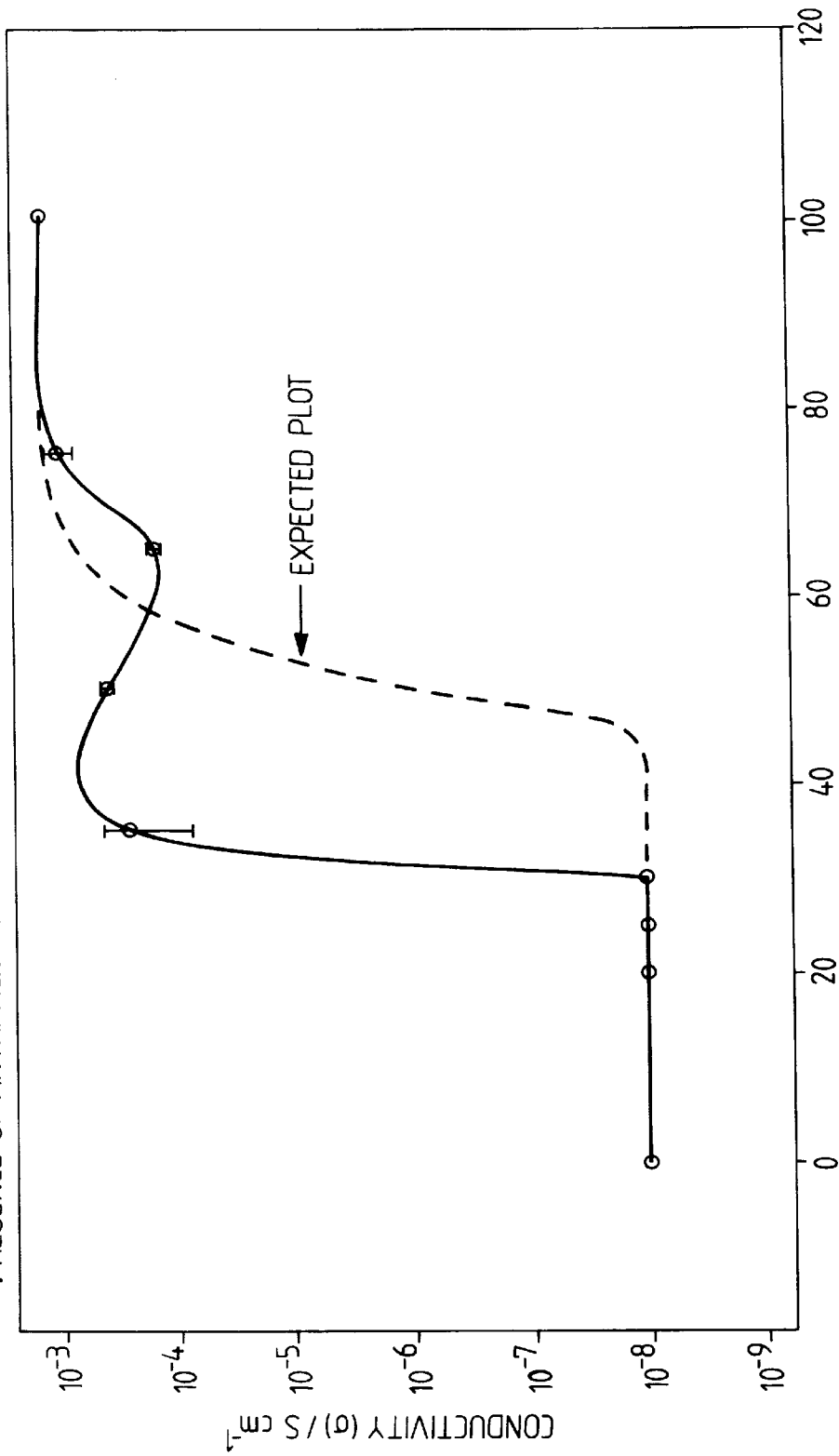
FIG. 18 is a semi-log plot corresponding to FIG. 17.

As can be seen from Table 2, the presence of AQ does not significantly diminish the electrical conductivity of a mixture of AQ and P9-AA even when the AQ content has reached 65% by weight. This indicates that there is a charge transfer effect between P9-AA and AQ. One charge transfer effect occurs at between 35 and 50% P9-AA (increasing the conductivity) and another at between 50 and 70% P9-AA (decreasing the conductivity). Linear and semi-log plots of conductivity versus mixture composition are presented as FIGS. 17 and 18.

The curves marked "expected plot" are those which would be expected if AQ had a purely diluent effect.

The following examples 22–25 relate to the preparation of 2-alkyl substituted-9-aminoanthracenes; examples 26 and 27 relate to polymerisations of the monomers by chemical means.

EXAMPLES

Preparation of the monomers

EXAMPLE 22

Synthesis of 2-ethyl-9-nitroanthracene

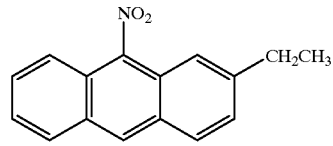

(XVIII)

2-Ethylanthracene (3.0 g; 0.0145 mole) (Source Aldrich) was suspended in acetic acid (30 ml). The flask was immersed in a water bath at 20–25° C. and 70% conc. nitric acid (1.1 ml; specific gravity 1.42; 0.017 mole) was added slowly by a pasteur pipette with vigorous stirring over a period of 5 minutes. The mixture was stirred for 4 hours at 25° C. To the clear homogeneous mixture was added via a dropping funnel a mixture of conc. HCl (10 ml) and acetic acid (10 ml) with vigorous stirring. A bright yellow solid (2-ethyl-9-nitro-10-chloro-9,10-dihydroanthracene) precipitated out and was filtered under suction. The solid was washed with acetic acid (15 ml) and water until the washings were neutral. The product was removed and triturated with warm (60–70° C.) 10% sodium hydroxide solution (25 ml). The yellow nitroanthracene was filtered under suction and treated with (3×10 ml) portions of 10% sodium hydroxide solution. The product was finally washed thoroughly with warm water until the washings were neutral and dried under vacuo. Yield 2.84 g (78%). $^1$H NMR and $^{13}$C NMR (in $CDCl_3$) indicated the presence of a major product and two minor products. Therefore, the product was purified by column chromatography over silica gel [solvent: ether—petroleum ether(40–60° C.) 1:1] to give a crystalline yellow solid.

IR, $\gamma_{max}$ (KBr disc): 2960, 1630, 1420, 1280, 900, 780 and 750 cm$^{-1}$ $^1$H NMR (300 MHz) δ: 1.34 (3H, t, CH$_3$), 2.86 (2H, q, CH$_2$) 7.42 (1H, d, J8.9Hz), 7.52 (1H, t), 7.62 (1H, dd), 7.67 (1H, s, 1-H), 7.97 (3H, m) and 8.54 (1H, s, 5-H).

EXAMPLE 23
Synthesis of 2-methyl-9-nitroanthracene

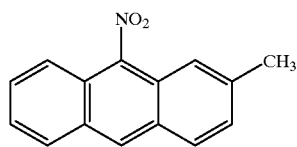

(XIX)

Nitration of 2-methylanthracene (Source Aldrich) was carried out using the same procedure as in example 1 to yield the 2-methyl-9-nitroanthracene as a yellow solid. 2-Methylanthracene (2.0 g; 0.010 mole) was suspended in glacial acetic acid (25 ml) and to the stirred solution was added concentrated nitric acid (0.6 ml; 0.014 mole). The solution was stirred in a water bath at 20–25° C. for 4 hours, until the solution became clear. To the clear solution a mixture of conc. HCl and acetic acid (20 ml; 1:1) was added via a dropping funnel over a period of 15 minutes. A yellow solid precipitated out. The solution was stirred for further 30 minutes and filtered under suction. The product was treated by the same method as described in example 1 to give the 2-methyl-9-nitroanthracene as a yellow solid (1.8 g; 73%).

$^1$H NMR (300 MHz), δ: 2.55 (3H, s, CH$_3$), 7.35 (1H, d, 3-H, J8.7Hz), 7.50 (1H, t), 7.61 (1H, t), 7.65 (RH, s, 1-H), 7.90 (1H, t), 8.0 (1H, d, 4-H, J8.7Hz) and 8.50 (1H, s, 5-H). Mass m/z (%): 237 (100, M$^+$), 226 (12), 208 (11), 207 (35), 191 (34), 189 (53), 178 (24), 176 (15) and 165 (15).

Further product recovered from the filtrate contained a mixture of two products. The product was further purified by column chromatography over silica gel [solvent: ether-petroleum ether(40–60° C.) 1:1] to give the pure product. The product had the same NMR as above.

EXAMPLE 24
Synthesis of 2-ethyl-9-aminoanthracene.

2-Ethyl-9-nitroanthracene (2.55 g; 0.01 mole) (See Example 1) was dissolved in acetic acid (20 ml). To the clear solution at 50° C., there was slowly added tin (II) chloride (9.6 g; 0.051 mole) in concentrated HCl (25 ml). The solution was stirred at 50° C. for 15 minutes and allowed to cool to room temperature. The yellow solid which precipitated was filtered off, washed with water and then neutralised with 10% NaOH solution. The amino derivative was thoroughly washed with water, dried in air overnight and then under vacuo at 50° C. for 5 hours. Yield 1.98 g (88%). The product became brown in colour and was slightly sticky.

Figure 19:
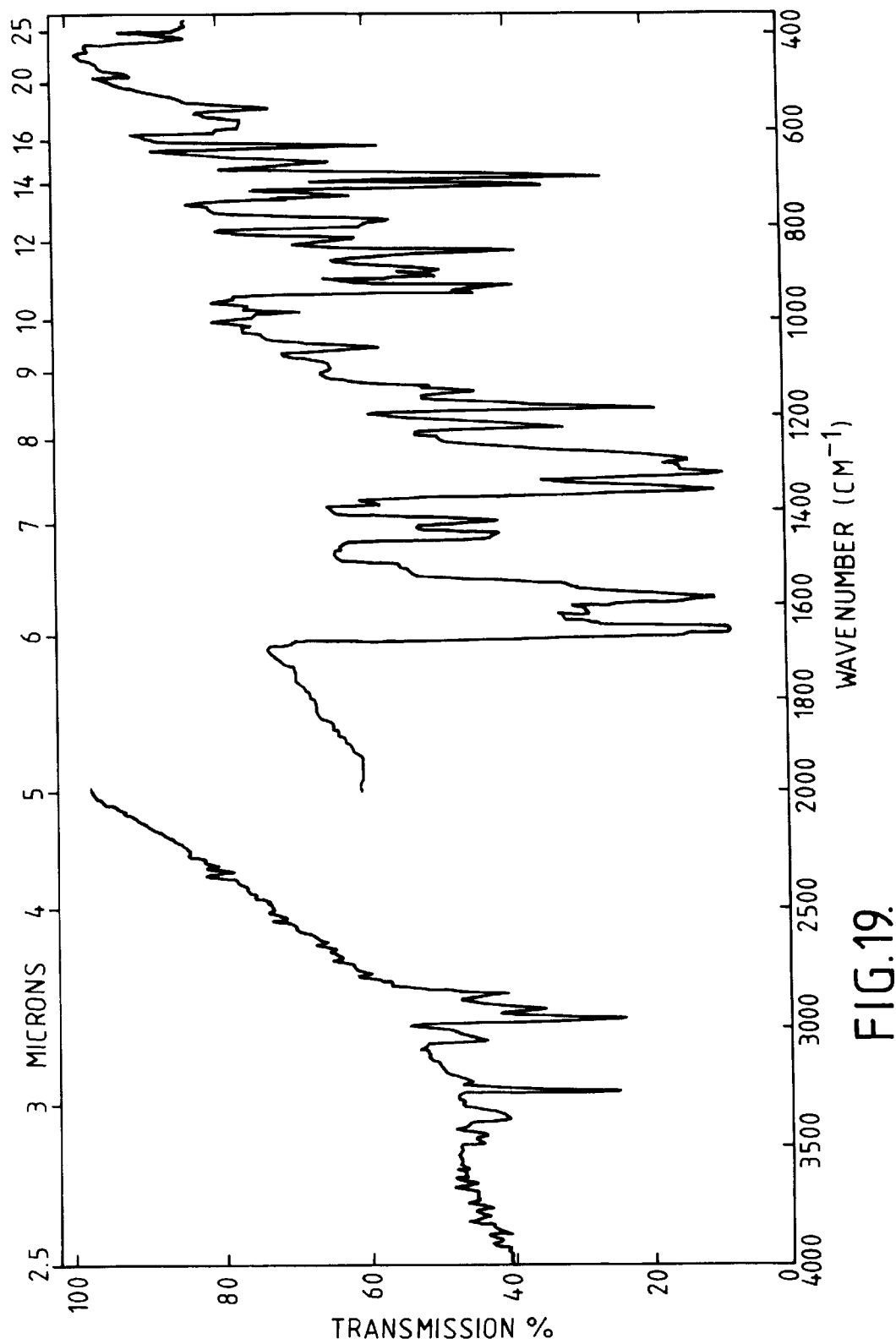
FIG. 19 is an IR spectrum on a KBr disc of 2-ethyl-9-aminoanthracene.

The IR spectrum of the product is shown in FIG. 19.

EXAMPLE 25
Synthesis of 2-methyl-9-aminoanthracene.

Reduction of 2-methyl-9-nitroanthracene (0.91 g; 0.00038 mole) (see Example 2) was carried out with tin (II) chloride (3.64 g; 0.0192 mole) as described in Example 24 to give the 9-amino derivative as a brown powder (0.49 g; 62%). T.l.c. indicated that the compound was pure.

EXAMPLES 26 and 27
Preparation of the polymers

EXAMPLE 26
Polymerisation of 2-ethyl-9-aminoanthracene using iron (III) chloride in chloroform.

To a suspension of iron (III) chloride (5.58 g; 0.034 mole) in chloroform (100 ml) was added 2-ethyl-9-aminoanthracene (1.90 g; 0.0086 mole) in chloroform (75 ml). The solution was stirred at room temperature overnight and then refluxed for 5 hours. The cooled solution was poured into methanol (300 ml) and stirred for 2 hours. The blackish solid which separated out was filtered off and washed with methanol. The residue was again taken up in a mixture of methanol (150 ml) and conc. HCl (2 ml), and refluxed for 18 hours. The solid was filtered off and dried under vacuo at 40° C. for 6 hours. Yield obtained 1.27 g (67%). Conductivity of the standard compacted disc was 7.5×10$^{-6}$ S cm$^{-1}$ using the four-probe technique described above.

Figure 20:
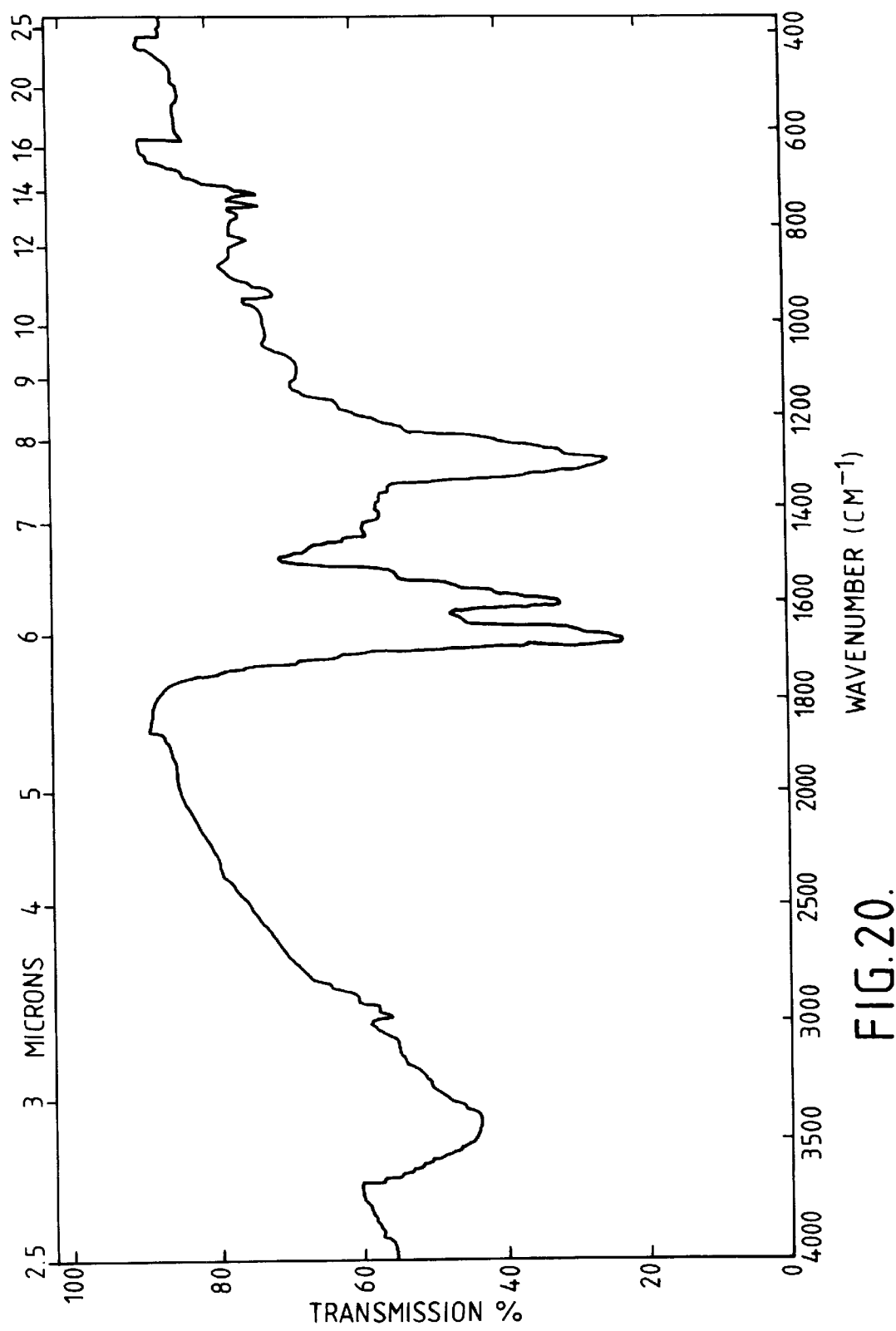
FIG. 20 is an IR spectrum on a KBr disc of 2-ethyl-poly-9-aminoanthracene.

The transmittance was 44% and the solubility was 1% in NMP and DMF. The IR spectrum for this compound is shown in FIG. 20.

EXAMPLE 27
Polymerisation of 2-methyl-9-aminoanthracene

2-Methyl-9-aminoanthracene (1.80 g, 0.0087 mole) was dissolved in CHCl$_3$ (50 ml) and added dropwise via a dropping funnel to anhydrous iron (III) chloride (5.64 g; 0.035 mole) in CHCl$_3$ (100 ml). The solution was stirred and refluxed under nitrogen atmosphere for 6 hours and then at room temperature overnight. Most of the solvent was removed by evaporation and the residue poured into methanol (300 ml). The blackish solid which separated out was filtered off and again refluxed with methanol-water (1:1) for 6 hours and stirred at room temperature overnight. The solid was filtered off under suction, washed with water followed by methanol and dried under vacuo at 60° C. for 5 hours. Yield obtained 0.21 g. Conductivity of the compacted disc was 7.0×10$^{-6}$ S cm$^{-1}$.

The transmittance was 56% and the solubility was 0.8% in TFA.

Table 3 summarises conductivity, transmittance and solubility values of the chemically polymerised polymers.

TABLE 3

Electrical conductivity of the substituted Poly(aminoanthracenes)

| Ex | Compound | Oxidant | Colour | C | S | T |
|---|---|---|---|---|---|---|
| 26 | Poly (2-ethyl-9-AA) | FeCl$_3$ in CHCl$_3$ | brown-black | 7.5 × 10$^{-6}$ | 1.0 (1) | 44 |
| 27 | Poly (2-methyl-9-AA) | FeCl$_3$ in CHCl$_3$ | light brown | 7.0 × 10$^{-6}$ | 0.8 (2) | 56 |

Notes on Table 3:
C - Conductivity (S cm$^{-1}$)
T - Transmittance of thin film (%) in the range 400–800 nm.
S - Solubility (% mass of polymer/volume of solvent)
(1) - in NMP and DMF
(2) - in TFA It will be appreciated that improved conductivity of these substituted polymers may be obtained by doping these polymers with suitable acid dopants, for example camphorsulphonic acid, 5-sulphosalicylic acid, paratoluenesulphonic acid, trifluoromethanesulphonic acid (triflic acid), methanesulphonic acid, trifluoroacetic acid, hydrochloric acid and sulphuric acid. Doping the polymers is a conventional technique for increasing the conductivity.

The following examples 28 and 29 relate to the preparation of the monomer, 9-AA; examples 30 to 36 relate to the co-polymerisation of the 9-AA monomer with aniline.

EXAMPLES
Preparation of the monomers

EXAMPLE 28
9-nitroanthracene as prepared in Example 1 was used.

EXAMPLE 29
9-aminoanthracene as prepared in Example 2 was used.

EXAMPLES 30–36
Preparation of the co-polymers

Figure 21:
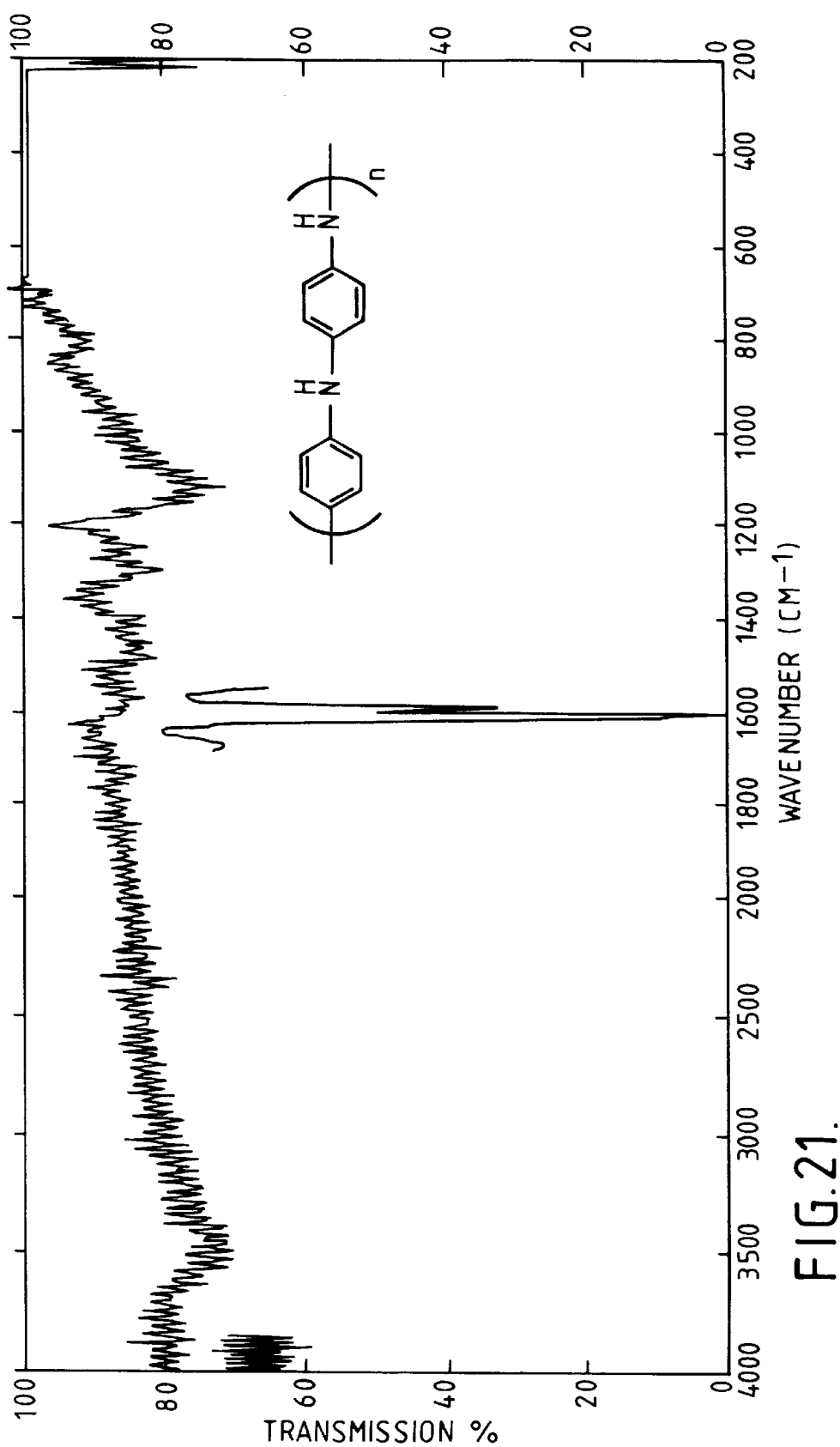
FIG. 21 is an IR spectrum on a KBr disc of polyaniline.
Figure 22:
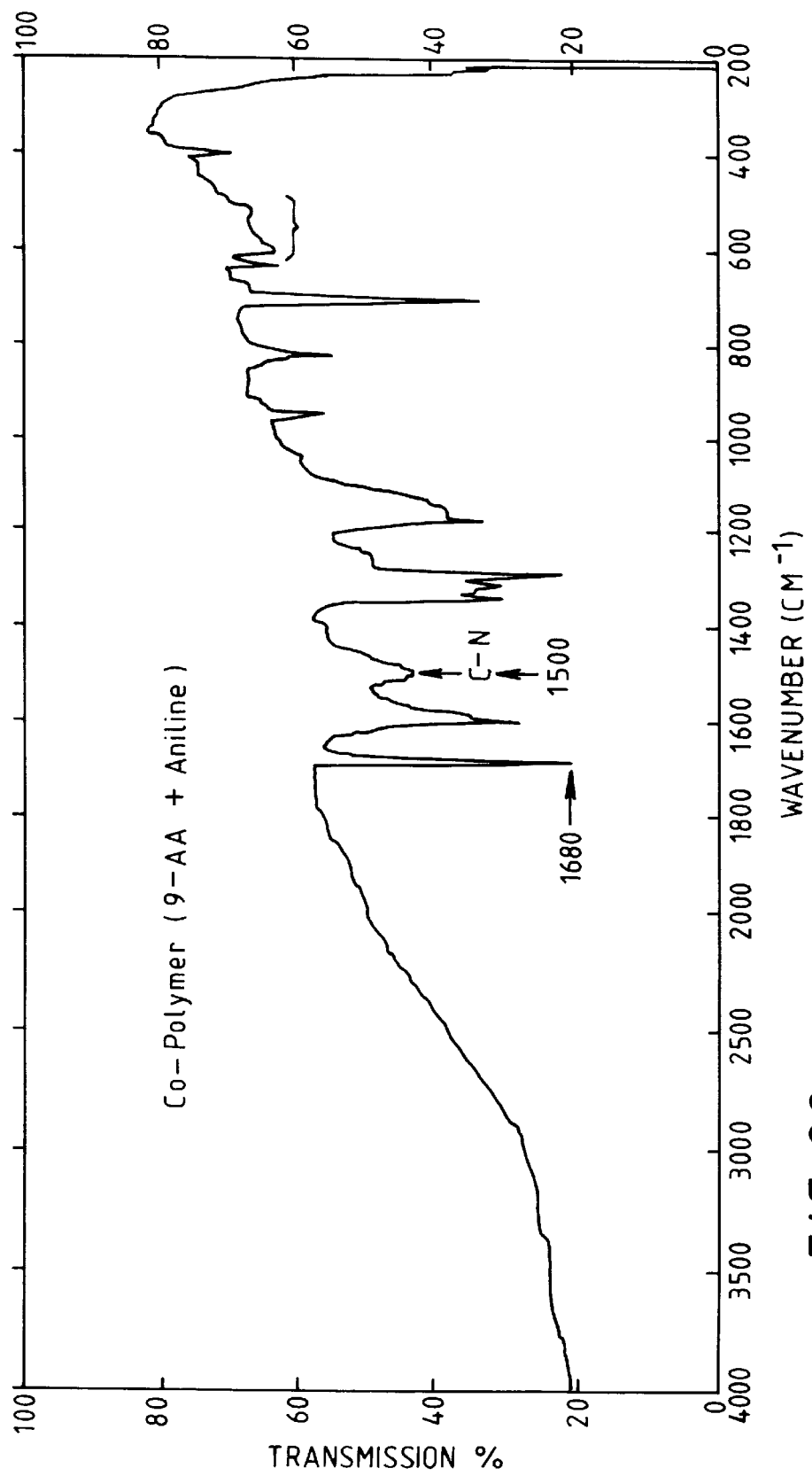
FIG. 22 is an IR spectrum on a KBr disc of a co-polymer of 9-AA and aniline using 5-SSA as the dopant.

As can be seen from FIG. 21, the IR spectrum of polyaniline has too much noise to show any clear peaks. FIG. 22 shows the IR spectra for co-polymers of 9-AA and aniline. As can be seen, this spectrum has clear peaks which is an indication that a co-polymer of the 9-AA and aniline has been produced.

EXAMPLE 30
Co-polymer of 9-AA and aniline (ratio 8:1)

9-AA (1.0 g; 0.0052 mole) was dissolved in acetonitrile (100 ml). To the magnetically stirred solution were added aniline (0.060 g; 0.0065 mole) and CSA (2.41 g; 0.0104 mole) in water (50 ml). The solution was stirred at room temperature for 30 minutes until the solution became clear. To the homogeneous solution was added ammonium persulphate (1.42 g; 0.0062 mole) in water (50 ml). The solution was stirred at room temperature for 3 hours during which time an off-white solid was separated out. This was filtered off under suction and dried under vacuo for 3 hours at 50° C. Yield obtained 0.93 g.

The conductivity of the sample was $2.1 \times 10^{-6}$ S cm$^{-1}$.

EXAMPLE 31
Co-polymer of 9-AA HCl and aniline (ratio 1:1)

9-AA.HCl (1.0 g) was dissolved in CH$_3$CN (50 ml). To the suspension was added aniline (0.42 g) in CH$_3$CN (10 ml), followed by water (50 ml). The solution was stirred at room temperature for 2 hours, but the solution did not become homogeneous. The solution was heated for 1 hour and then cooled to room temperature. To the solution was added ammonium persulphate (1.2 g) in water (10 ml) and the resulting mixture was stirred for 20 hours.

The solution became blue-black in colour. The polymer was filtered off and washed with 1.2 M HCl. and dried in the vacuum oven for 8 hours. Yield obtained was 0.725 g. Conductivity of the polymer was $2.2 \times 10^{-2}$ S cm$^{-1}$.

EXAMPLES 32 to 36
Co-polymers of 9-AA and aniline

9-AA (1 mole) was dissolved in a suitable solvent (100 ml)—see Table 4 for details of solvent, ratio of 9-AA:aniline and dopants. To the stirred solution, at room temperature, was added a mixture of aniline (different molar ratios) and acid (2 moles) in water (50 ml). The solution was stirred until it became homogeneous and then ammonium persulphate (1.2 mole) in water (50 ml) was added. The solution was stirred until the solution became coloured. The solution was filtered, washed with water, methanol and dried in vacuo for 5 to 6 hours at 50° C. Electrical conductivity was measured using the 4-probe method on a compacted disc. When 9-AA hydrochloride was used, no acid was added.

TABLE 4 co-polymerisation of 9-AA and aniline

| Ex | ratio | Solvent | Acid | Colour | Conductivity (S cm$^{-1}$) |
|---|---|---|---|---|---|
| 32 | 8:1 | CH$_3$CN—H$_2$O | CSA (2) | off-white | $2.1 \times 10^{-6}$ |
| 33 | 1:1 | CH$_3$CN—H$_2$O | HCl (1) | light blue-black | $2.3 \times 10^{-2}$ |
| 34 | 1:1 | CH$_3$CN—H$_2$O | HBF$_4$ | bluish | $4.7 \times 10^{-2}$ |
| 35 | 1:1 | EtOH—H$_2$O | HCl (1) | greenish-blue | $5.0 \times 10^{-2}$ |
| 36 | 1:0.5 | CH$_3$CN—H$_2$O | 5-SSA | blue | $6.9 \times 10^{-4}$ |

Notes on Table 4
(1) 9-aminoanthracene hydrochloride was used
(2) may be homo poly (9-AA)
CSA camphorsulphonic acid
HBF$_4$ fluoroboric acid
5-SSA 5-sulphosalicylic acid FIG. 22 shows the IR spectrum for the co-polymer produced in example 36. The peak at 1680 cm$^{-1}$ and the cluster of peaks between 1300 and 1350 cm$^{-1}$ may indicate the presence of anthraquinone in the sample.

It has further been found that the colour of the co-polymer may be tuned to a lighter colour by quenching the reaction as soon as the oxidation takes place.

What is claimed is:

1. Poly (9-aminoanthracene) free or substantially free of anthraquinone.

2. Poly (9-aminoanthracenes) having an oxidation state from zero to 1.0 and a formula (II) at an oxidation state of zero and a formula (III) at an oxidation state of 1.0 as follows

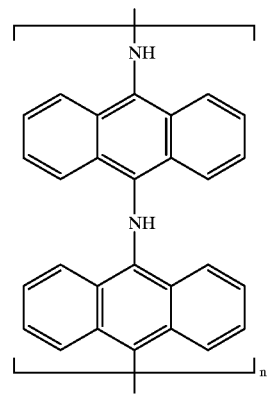

(II)

(III)
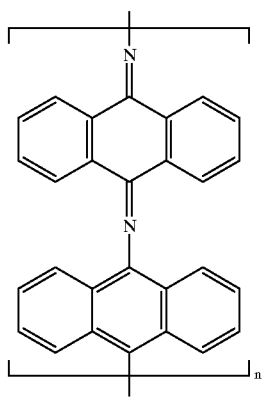
in which n is an integer ranging from 10 to 100.
3. Poly (9-aminoanthracenes) as claimed in claim 2 characterised in that they have an oxidation state between 0.25 to 0.75, and a formula (V) at an oxidation state 0.25, a formula (VI) at an oxidation state 0.5 and a formula (VII) at an oxidation state 0.75 as follows
(IV)
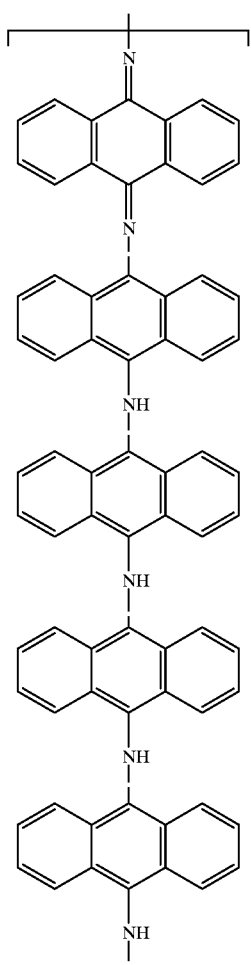
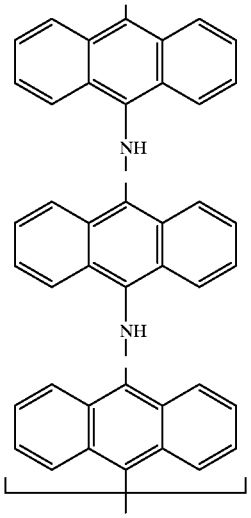
(V)
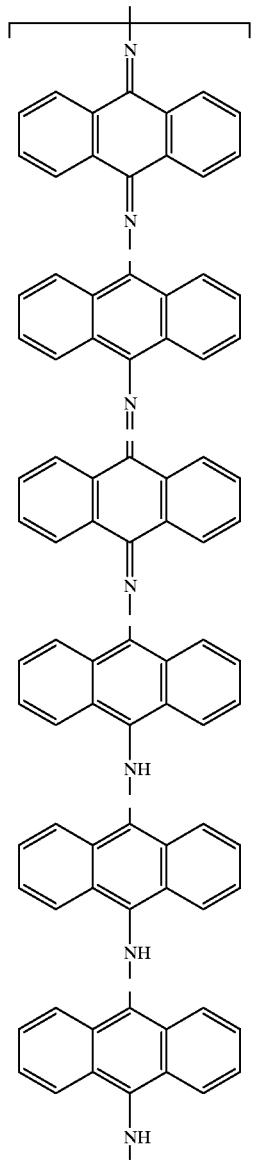

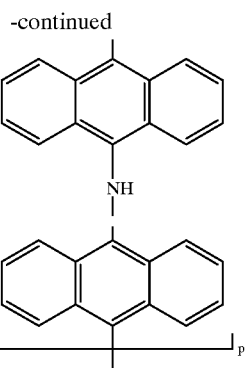

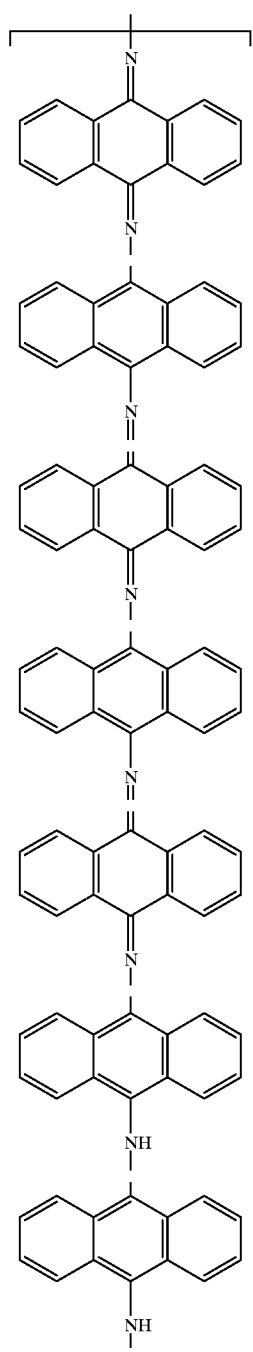

(VI)

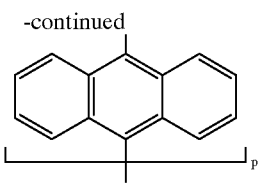

in which p is an integer ranging from 2 to 25.

4. A mixture of poly (9-aminoanthracene) and 1,4-anthraquinone, in which the ratio of poly (9-aminoanthracene) to anthraquinone is in the range 35:65 to 99.99:0.01.

5. A mixture as claimed in claim 4, in which the ratio of poly (9-aminoanthracene) to anthraquinone is in the range 35:65 to 50:50.

6. A mixture as claimed in claim 4, in which the product has a transmittance of at least 50% in the range 400–800 nm at a thickness of 100 nanometers.

7. A method of production of poly (9-aminoanthracene) free or substantially free of anthraquinone, in which 9-aminoanthracene is oxidised to the polymer from its salt 9-aminoanthracene hydrochloride in the presence of air by neutralising the acidic solution over a period of time to a pH in the range 8 to 10 using mildly basic conditions, the solution being maintained at a pH in the range 5 to 6.5 for a period of at least 2 hours.

8. A method as claimed in claim 7, in which 9-nitroanthracene is reacted with hydrated tin chloride and acetic acid in the presence of concentrated HCl to produce an aqueous solution of 9-aminoanthracene hydrochloride salt, and the solution is stirred in air at room temperature while 5% aqueous ammonia solution is added slowly until the pH rises to 1.5 to 2.0, the solution is stirred at this pH for at least 5 minutes and then further 5 aqueous ammonia is added slowly to bring the pH up to the range 5.8 to 6.0 and the stirring is continued at that pH for 3 to 6 hours and then further 5% aqueous ammonia is added to bring the pH into the range 8.5 to 9.0 with continued stirring, and the yellow solid which precipitates out is recovered.

9. A method of production of poly (9-aminoanthracene) free or substantially free of anthraquinone, in which 9-aminoanthracene is electropolymerized using ortho-dichlorobenzene as the solvent and tetrabutylammonium perchlorate as the supporting electrolyte.

10. A method as claimed in claim 9, in which the electropolymerisation is carried out at constant current or at constant potential.

11. 9-aminoanthracene moieties of the general formula (I);

(VII)

where, R may be the same as or different to R', and may be a hydrogen atom (when R=R'=H, the compound is 9-aminoanthracene), or $CH_3$, $CH_3CH_2$—, —$OCH_3$, —$OCH_2CH_3$, —$CH_2OCH_3$, —$CH_2OCH_2CH_2OCH_3$, methoxyethoxyethoxymethyl, aryloxymethyl, phenyl, Cl, Br, CN or $NO_2$, —$CH_2COOR$ or —$CH_2NHCOR''$ (where R'' is $C_1$–$C_6$ alkyl or a phenyl or biphenyl group), provided that R and R' are not both hydrogen.

12. 9-aminoanthracene moieties as claimed in claim 11 characterized in that the position of substitution is position −2 of the B-ring.

13. 9-aminoanthracene moieties as claimed in claim 11 or claim 17 characterized in that R=H and R' is at the 2 position and R'=Me, ethyl, methoxy, ethoxy, methoxymethyl, methoxyethoxymethyl or aryloxymethyl.

14. Poly (9-aminoanthracenes) having an oxidation state from zero to 1.0 and a formula (VIII) at an oxidation state of zero and a formula (IX) at an oxidation state of 1.0 as follows

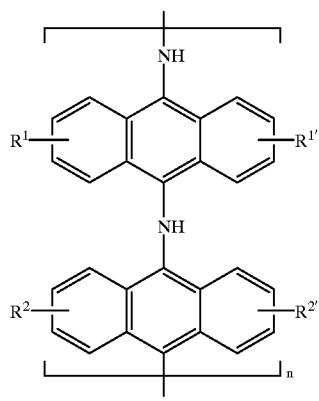

(VIII)

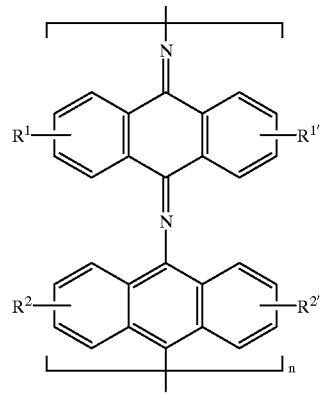

(IX)

in which R1 and R2 can be the same or different and R1' and R2' can be the same or different and can be the same or different to R1 and R2 and n is an integer ranging from 10 to 100.

15. A polymer as claimed in claim 14 characterized in that R1=R2=H and R1'=R2'=CH$_3$, CH$_3$CH$_2$—, —OCH$_3$, —OCH$_2$CH$_3$, —CH$_2$OCH$_3$, —CH$_2$OCH$_2$CH$_2$OCH$_3$, methoxyethoxyethoxymethyl, aryloxymethyl, phenyl, Cl, Br, CN or NO$_2$, —CH$_2$COOR or —CH$_2$NHCOR" (where R" is C$_1$–C$_6$ alkyl or a phenyl or biphenyl group).

16. Poly (9-aminoanthracenes) as claimed in claim 14 or claim 15 characterised in that they have an oxidation state between 0.25 to 0.75, and a formula (X) at an oxidation state 0.25, a formula (XI) at an oxidation state 0.5 and a formula (XII) at an oxidation state 0.75 as follows

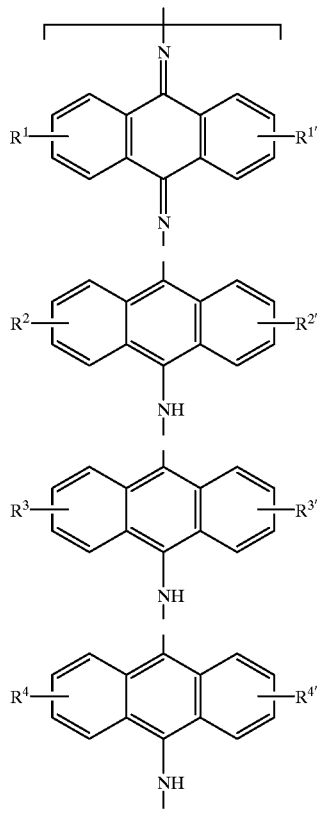 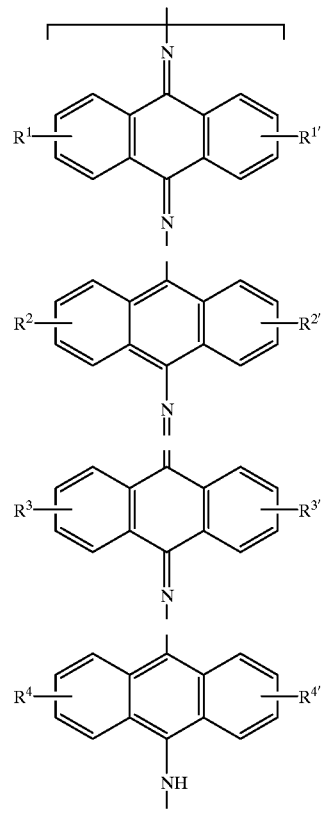 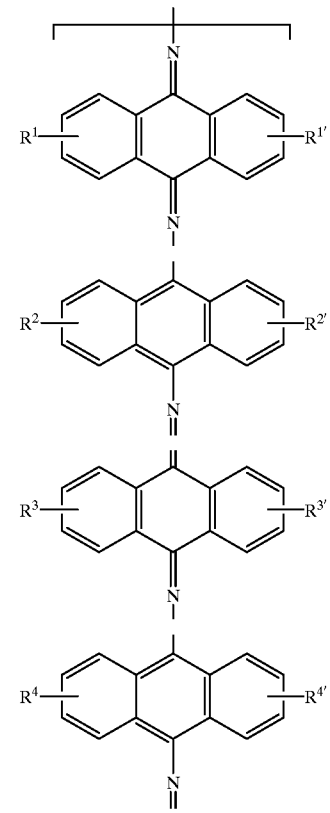

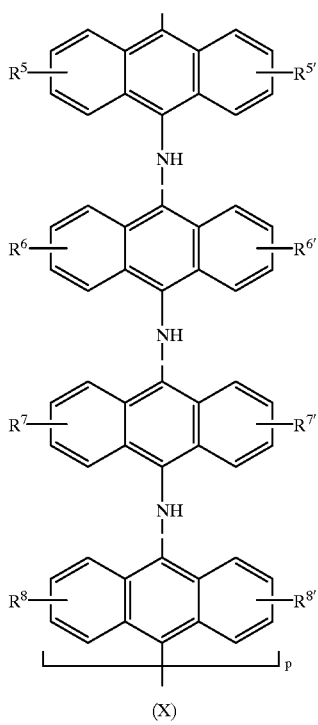 (X)

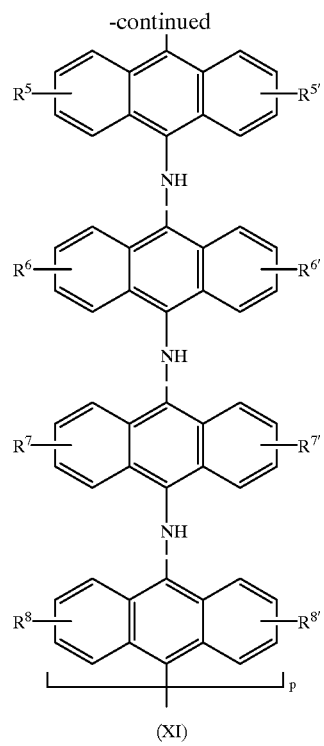 (XI)

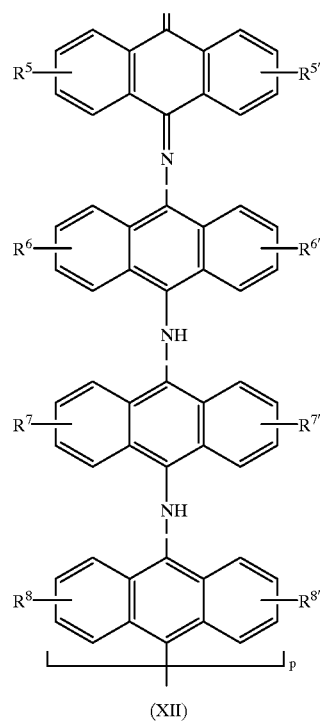 (XII)

in which R1, R2, R3, R4, R5, R6, R7 and R8 can be the same or different and R1', R2', R3', R4', R5', R6', R7' and R8' can be the same or different and can be the same or different to R1, R2, R3, R4, R5, R6, R7 and R8 and p is an integer ranging from 2 to 25.

17. A polymer as claimed in claim 16 characterized in that R1=R2=R3=R4=R5=R6=R7=R8=H and R1'=R2'=R3'=R4'=R5'=R6'=R7'=R8'=$CH_3$, $CH_3CH_2$—, —$OCH_3$, —$OCH_2CH_3$, —$CH_2OCH_3$, —$CH_2OCH_2CH_2OCH_3$, methoxyethoxyethoxymethyl, aryloxymethyl, phenyl, Cl, Br, ON or $NO_2$, —$CH_2COOR$ or —$CH_2NHCOR''$ (where R'' is $C_1$–$C_6$ alkyl or a phenyl or biphenyl group).

18. A polymer as claimed in any one of claims 14 to 17 characterized in that the position of substitution is position −2 of the B-ring.

19. A polymer as claimed in any one of claims 14 to 18 characterized in that R=H and R' is at the 2 position and R'=Me, ethyl, methoxy, ethoxy, methoxymethyl, methoxyethoxymethyl or aryloxymethyl.

20. Co-polymers of 9-aminoanthracene with aniline.

21. Co-polymers as claimed in claim 20, in which the ratio of 9-AA:aniline is in the range 1:5 to 20:1.

22. Co-polymers as claimed in claim 20 or claim 21, in which the ratio of 9-AA:aniline is in the range 1:2 to 8:1.

23. Co-polymers as claimed in any one of claims 20 to 22, in which the ratio of 9-AA:aniline is in the range 1:2 to 2:1.

24. A co-polymer having the general formula (XVI)

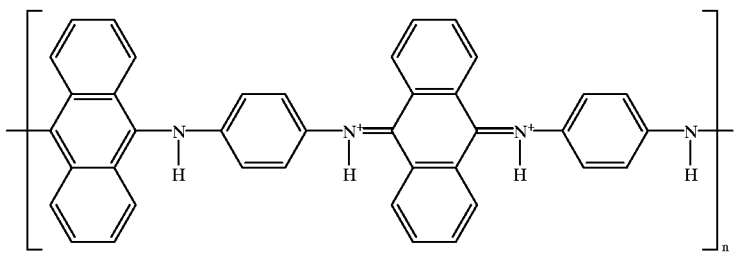 (XVI)

where n is an integer ranging from 4 to 50.

25. A method of production of a co-polymer of 9-AA with aniline, comprising co-polymerising 9-AA with aniline using an oxidant.

26. A method as claimed in claim 25, in which the oxidant is ammonium persulphate.

27. A method as claimed in claim 25 or claim 26, in which the 9-AA is dissolved in a solvent, a mixture of aniline in acid and water is added to this solution, the solution is stirred until it becomes coloured and a precipitate is produced which is then filtered, washed and dried to yield the co-polymer.

28. A method as claimed in claim 25, 26 or 27, in which the co-polymer is doped with camphorsulphonic acid (CSA), 5-sulphosalicylic acid (5-SSA), hydrochloric acid (HCl), a fluoroboric acid such as $HBF_4$, or a mixture thereof.

29. A method of preparing a visual display comprising forming a transparent coating from a material containing the poly(9-aminoanthracene) of claim 1.

30. A method of preparing an article, comprising forming the article from a material containing the poly(9-aminoanthracene) of claim 1, wherein said article exhibits static shielding.

31. A method of preparing an article, comprising forming the article from a material containing the mixture of claim 4, wherein said article exhibits static shielding.

32. A method of preparing an article, comprising forming the article from a material containing the mixture of claim 4, wherein said article exhibits electrostatic dissipation.

33. A method of preparing an article, comprising forming the article from a material containing the mixture of claim 4, wherein said article exhibits antistatic property.

34. A method of preparing an article, comprising forming the article from a material containing the the polymer of claim 11, wherein said article exhibits antistatic property.

35. A method of preparing an article, comprising forming the article from a material containing the polymer of claim 11, wherein said article exhibits static screening or shielding.

36. A method of preparing a transparent coating, comprising forming said coating from a material containing the copolymer of 9-AA with aniline of claim 20, wherein said coating exhibits electroconductivity.

37. A method of preparing an article, comprising forming the article from a material containing the copolymer of 9-AA with aniline of claim 20, wherein said article exhibits static shielding.

* * * * *